(12) United States Patent
Tamiya et al.

(10) Patent No.: US 6,198,716 B1
(45) Date of Patent: *Mar. 6, 2001

(54) DISK PLAYER INCLUDING A DISK CHUCKING MECHANISM AND PLATE SEPARATOR DEVICE

(75) Inventors: Tadanori Tamiya; Shinichi Aoki, both of Tottori (JP)

(73) Assignees: Sanyo Electric Co., Ltd., Osaka-fu; Tottori Sanyo Electric Co., Ltd., Tottori-ken, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,383

(22) Filed: Dec. 2, 1997

(30) Foreign Application Priority Data

| Dec. 3, 1996 | (JP) | ................................................. 8-323124 |
| Dec. 6, 1996 | (JP) | ................................................. 8-327312 |
| Dec. 6, 1996 | (JP) | ................................................. 8-327313 |
| Jul. 25, 1997 | (JP) | ................................................. 9-200284 |

(51) Int. Cl.[7] .................................................. G11B 23/00
(52) U.S. Cl. .......................................................... 369/270
(58) Field of Search ........................... 369/270, 37, 271; 360/99.08, 99.05, 99.12

(56) References Cited

U.S. PATENT DOCUMENTS

| 3,260,529 | * | 7/1966 | Brown | ................................. 369/208 |
| 3,871,663 | * | 3/1975 | Stave | ................................... 369/270 |
| 5,166,920 | * | 11/1992 | Kogure | ................................. 369/270 |
| 5,481,512 | * | 1/1996 | Morioka et al. | ....................... 369/36 |
| 5,561,657 | * | 10/1996 | Ogawa | ................................. 369/179 |
| 5,774,445 | * | 6/1998 | Sawi et al. | ........................... 369/270 |

* cited by examiner

*Primary Examiner*—David Davis
(74) *Attorney, Agent, or Firm*—Arent Fox Kintner Plotkin & Kahn, PLLC

(57) ABSTRACT

A disk player includes comprises a magazine and a player portion. When a disk is played, the magazine is loaded in the player portion. A plurality of plates on which disks are to be put are stacked in the magazine. Each of the plates can be separated from each other by not sliding but moving upward and downward. In this separated state, a pickup arm which is equipped with a pickup and a chucking mechanism enters a portion between the plates. After the entrance, the plates in steps above the selected disk further rise, and the plate on which the selected disk falls. By the fall, the selected disk is put on a disk table in the chucking mechanism. Thereafter, a claw member protrudes from the disk table, to clamp the selected disk through a center hole of the selected disk. The necessity of a member for rotatably pressing the selected disk from above is eliminated. Consequently, the disk player can be made thin.

3 Claims, 24 Drawing Sheets

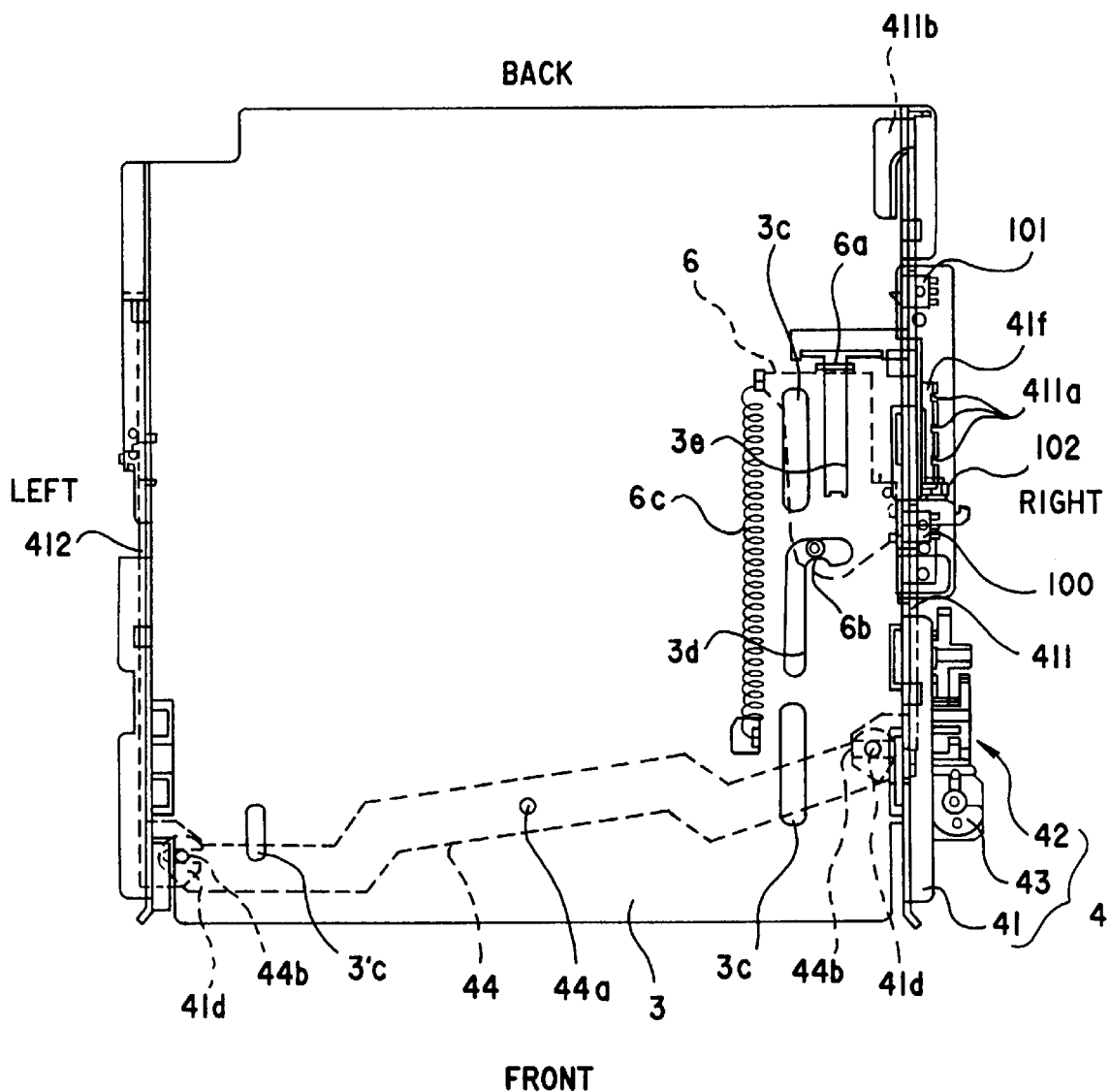

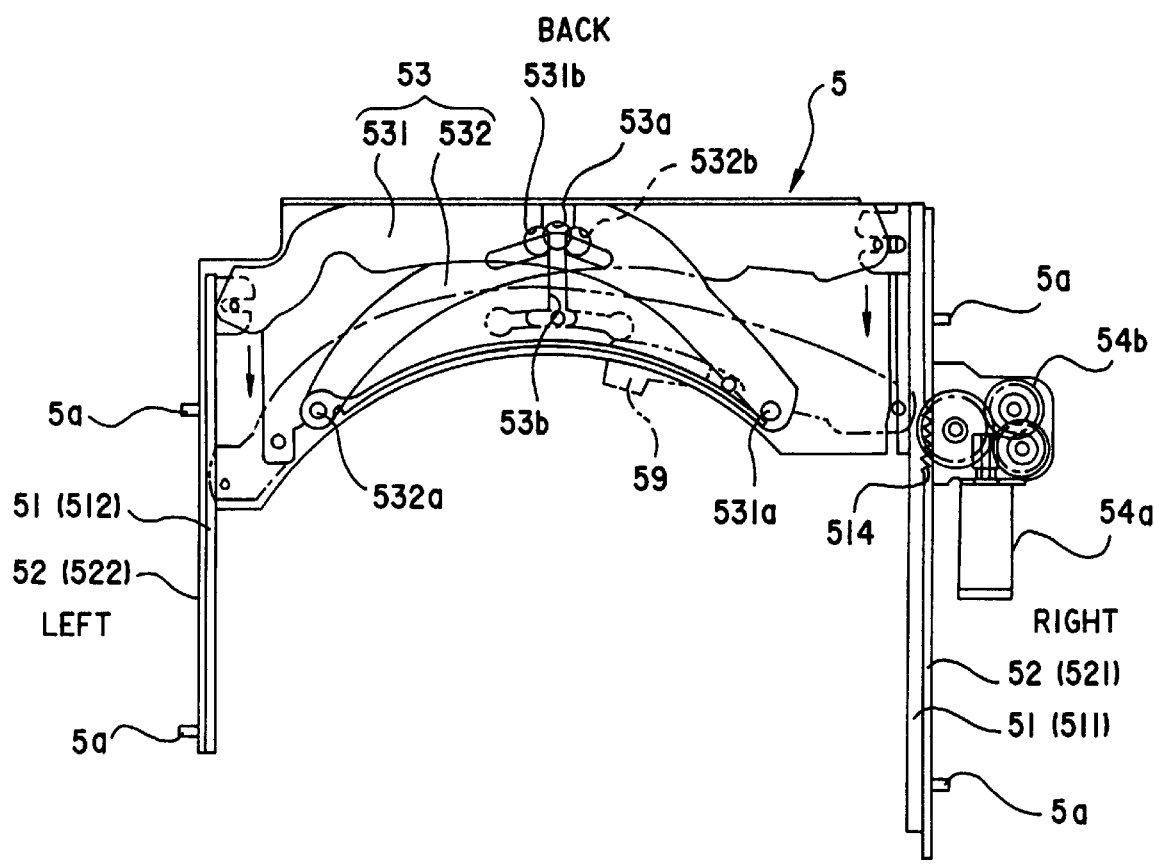

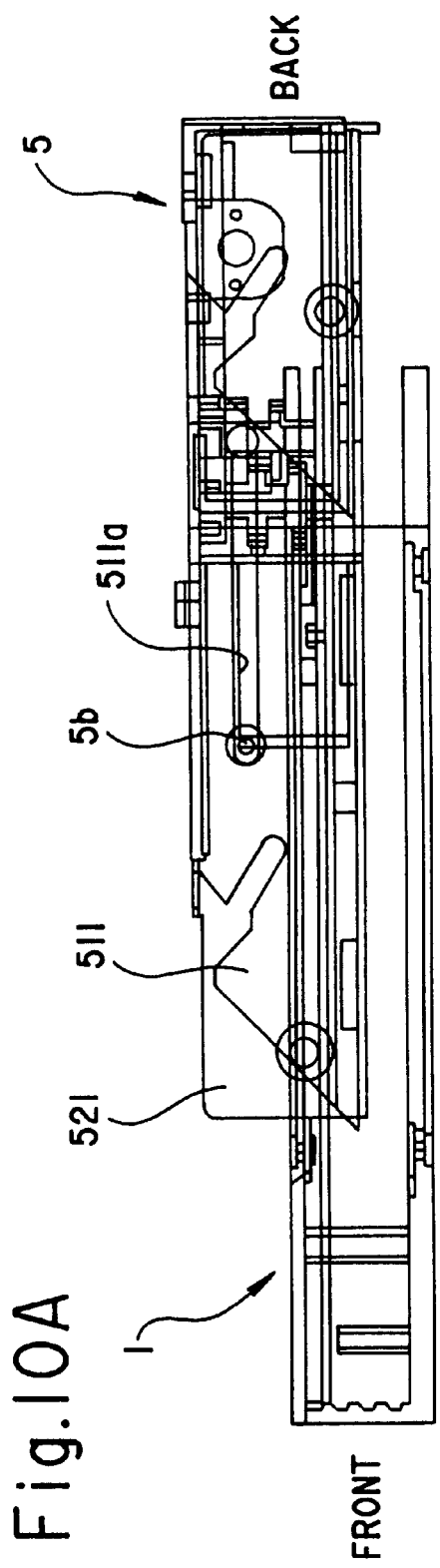
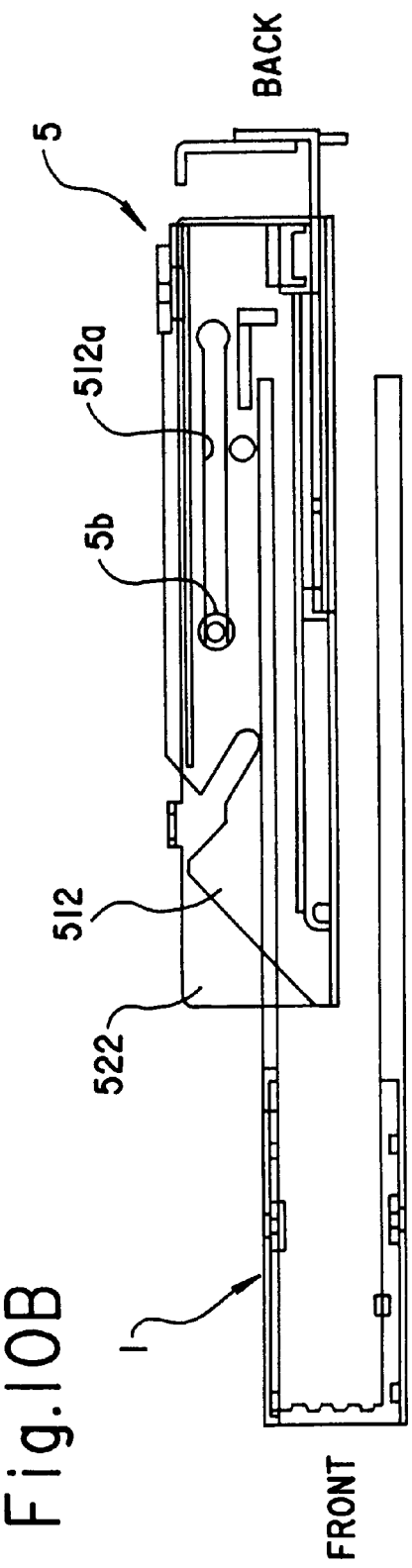

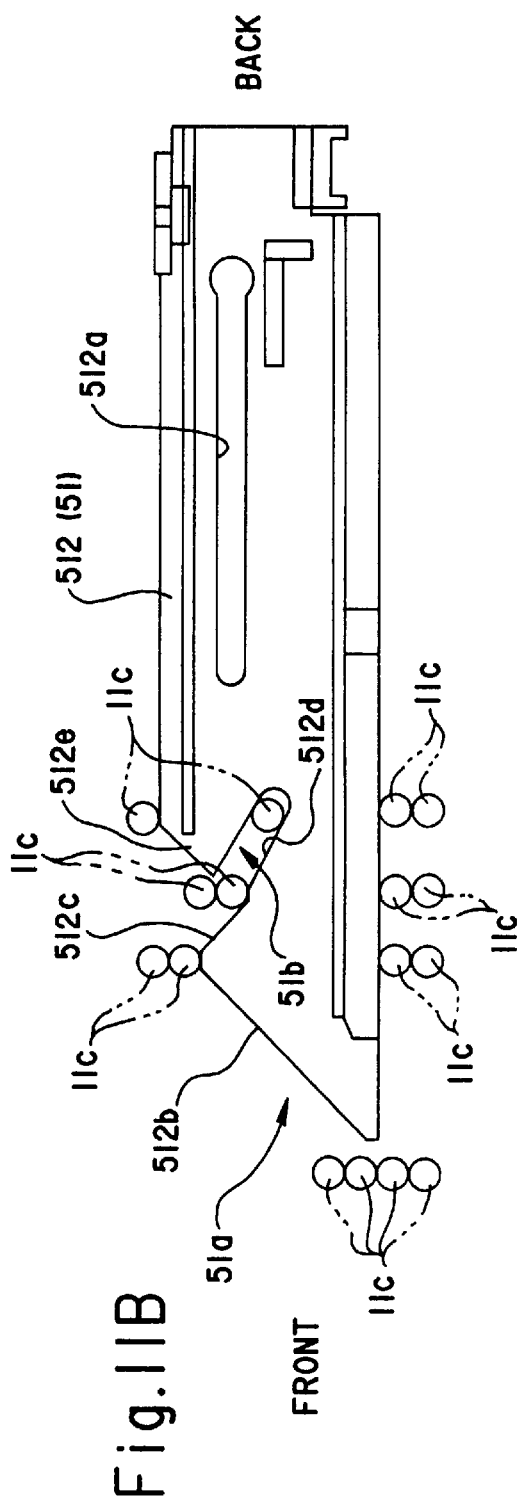

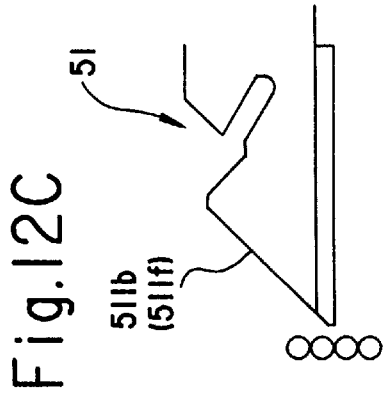
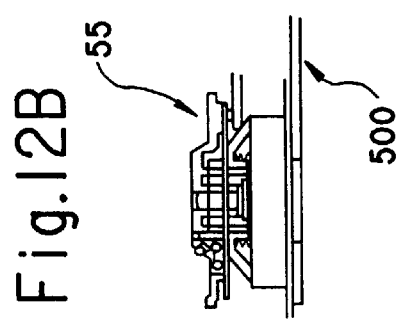
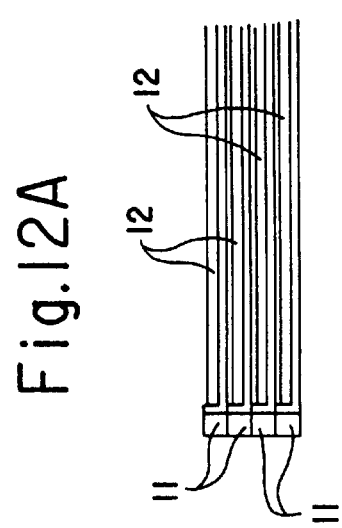
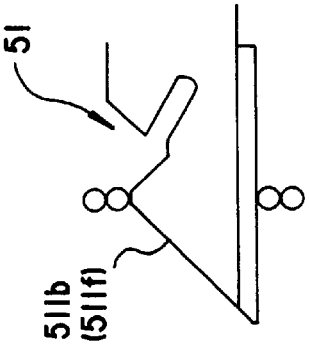
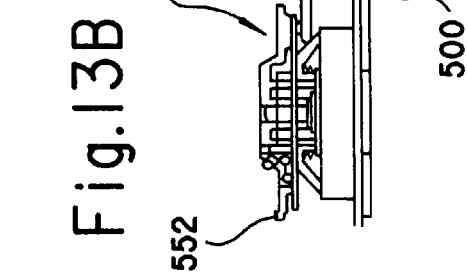
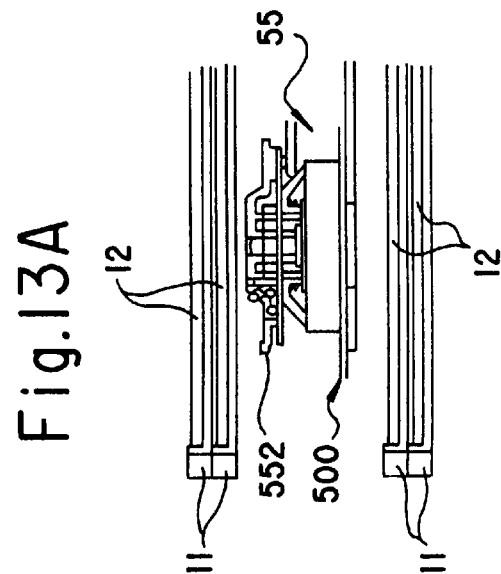

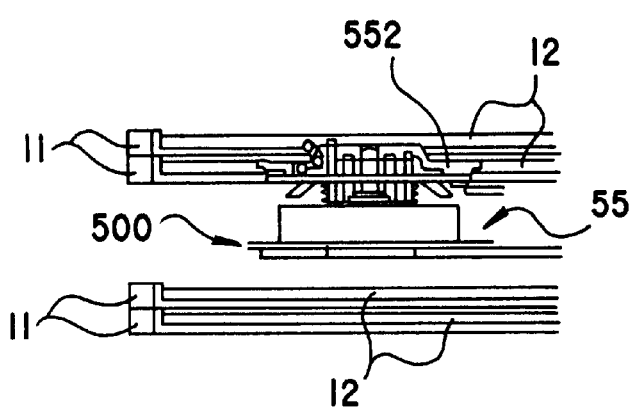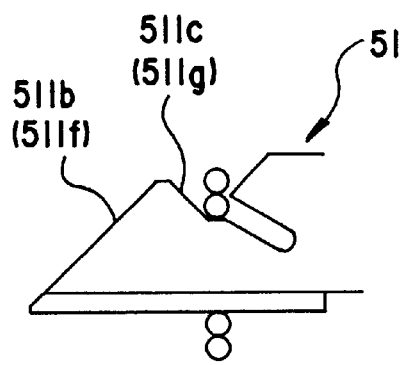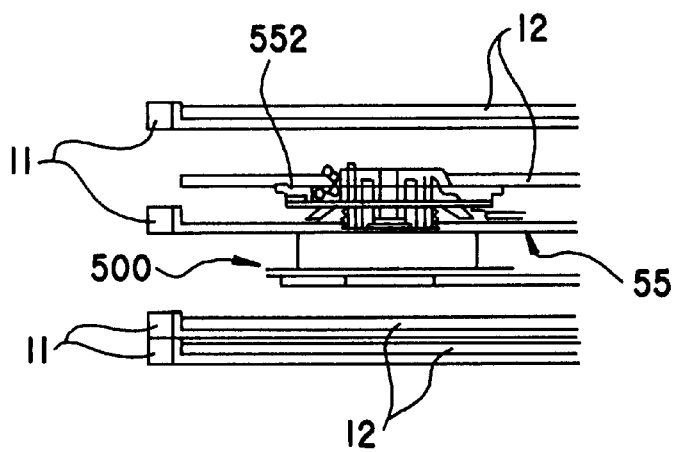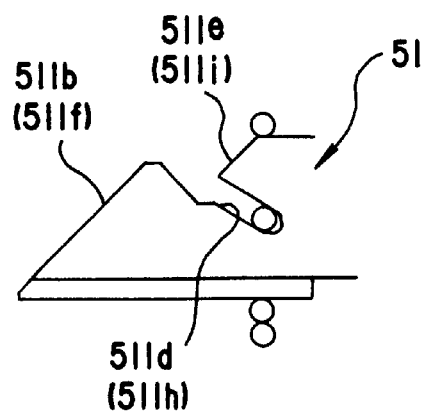

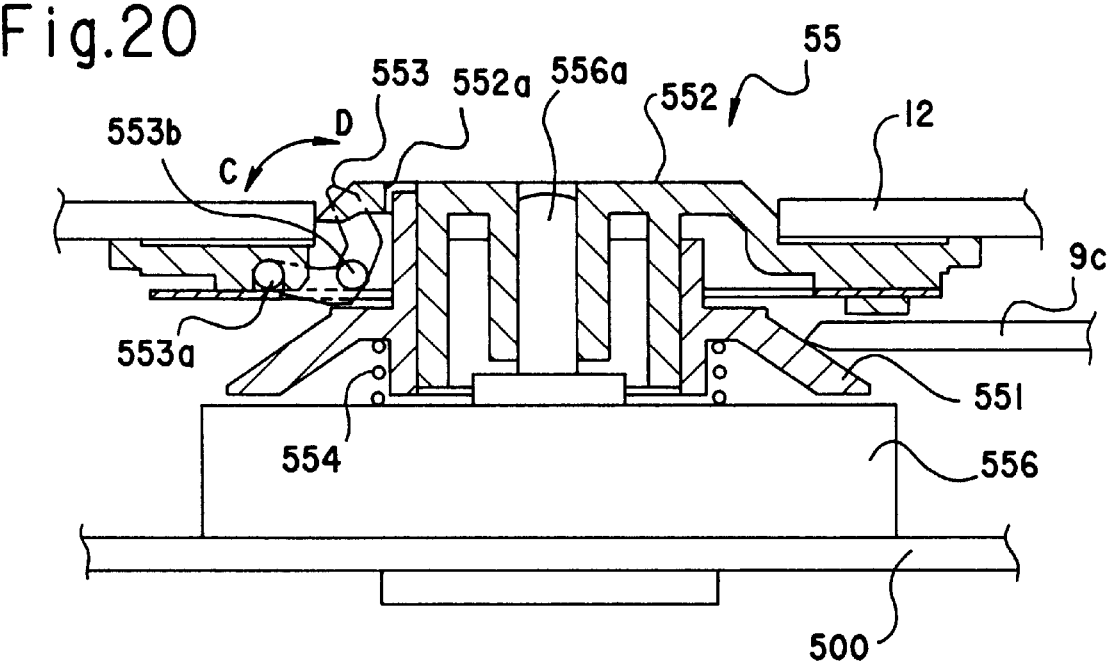
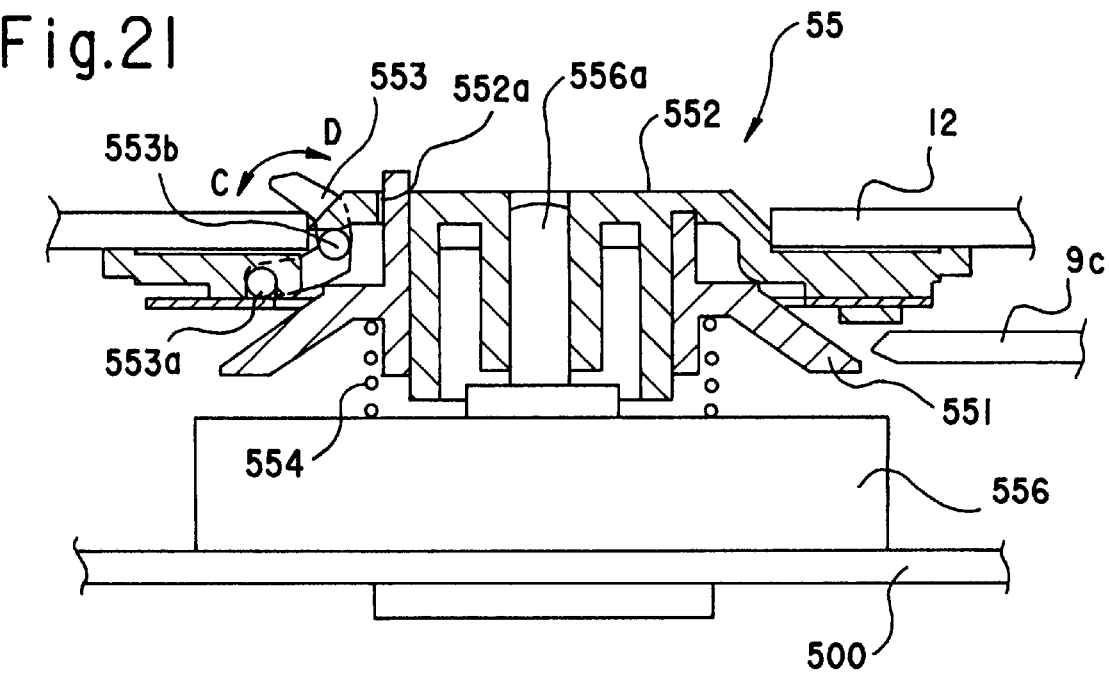

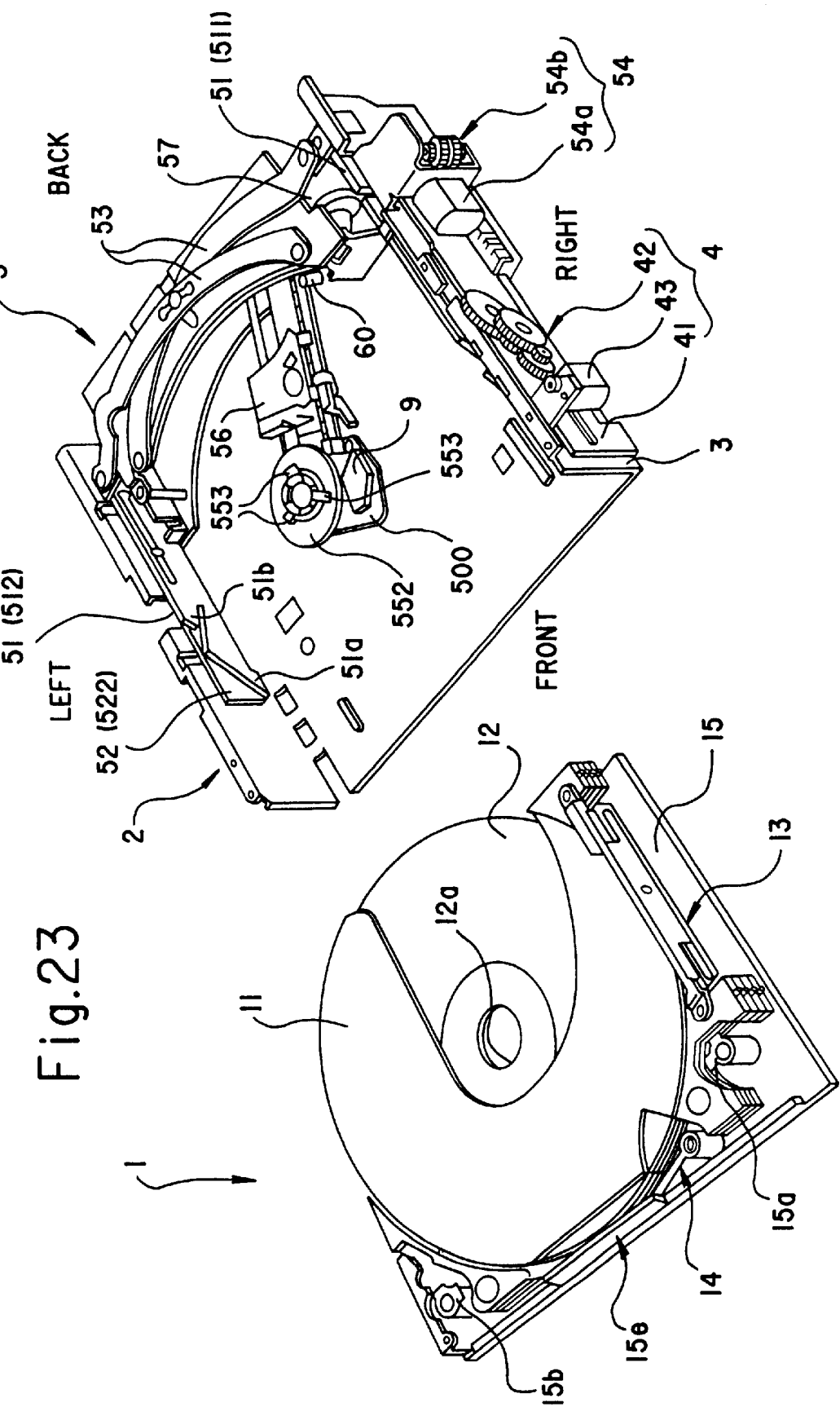

DISK PLAYER INCLUDING A DISK CHUCKING MECHANISM AND PLATE SEPARATOR DEVICE

BACKGROUND OF THE INVENTION

1. Field of the Invention

The present invention relates to a disk player using a magazine in which a plurality of disks are loaded in a stacked state for selecting the arbitrary disk out of the plurality of disks and playing the selected disk, and a disk chucking mechanism suitable for use in the disk player.

2. Description of the Prior Art

An example of this type of conventional disk player is one so adapted that a plate on which a disk is put is slid backward and forward or sideward and is pulled out from a magazine, to position the plate above or below a pickup in a player main body portion, and the disk on the plate is clamped by a disk chucking mechanism provided in the player main body portion to rotate the disk.

In the conventional structure, however, a space for pulling out the disk from the magazine must be ensured on the side of the disk player, and the space increases the size of the disk player.

Therefore, considered is a structure in which plates, each having a disk thereon, in steps above and steps below a plate of selected disk are respectively separated upward and downward without sliding the plate on which the selected disk is put, and a component equipped with a pickup and a disk chucking mechanism is moved into a magazine to clamp the selected disk.

Consequently, a disk player having such a structure can be miniaturized, as compared with the disk player having the structure in which the selected disk is pulled out and is played, because the necessity of the space for pulling out the disk is eliminated.

The conventional general disk chucking mechanism comprises a rotary driving portion rotated by a motor and a rotatable driven portion for pressing a disk from above, and enters a center hole of the disk from below. The thickness of the disk chucking mechanism having such a structure is increased because the rotatable driven portion for pressing the disk from above is required.

When the above-mentioned disk chucking mechanism is employed for the disk player having the structure in which the plates on which the disks are put are separated from each other upward and downward, therefore, the distance between the separated plates is increased, whereby the thickness of the disk player is increased, or the number of disks which can be loaded in the magazine is decreased.

Japanese Patent Laid-Open No. 157859/1991 discloses a disk chucking mechanism having a structure in which the thickness thereof is decreased. The mechanism comprises a disk table, on which a disk provided with a center hole is put, rotated by a rotary driving mechanism, a fitting member arranged in the center of the disk table and fitted in the center hole of the disk, and a plurality of spherical members so disposed that they can retract into the fitting member and urged in the direction in which they protrude from the fitting member by an elastic member for pressing and supporting the disk put on the disk table against the disk table. It is considered that the disk chucking mechanism having such a structure is incorporated into the above-mentioned structure in which the plates are separated from each other upward and downward.

In the mechanism disclosed in the above-mentioned gazette, however, an inner side surface of the center hole of the disk must get over the spherical members in order to chuck the disk. For this purpose, a force for temporarily pressing the disk against the disk table is required. In the structure using the magazine, the force cannot be applied by a person. Therefore, the force must be applied by any mechanism. When such a structure is newly incorporated, the structure of the disk chucking mechanism becomes complicated.

Furthermore, in the disk player having the structure in which the plates in the magazine are separated from each other upward and downward, there is provided an arm for supporting and moving the disk chucking mechanism in order that the disk chucking mechanism is positioned in the center hole of the disk in a separated state (playing time), while retracting from the disk in a non-separated state (non-playing time). In this case, the length of the arm is larger than the radius of the disk. A pickup and its moving mechanism are carried on the arm in addition to the disk chucking mechanism. Further, the disk is put thereon at the time of playing. When a mechanism for rotating the arm by a supporting shaft provided at its one end is employed, the arm is slightly inclined when the disk is put thereon. If the amount of rise of the disk in a case where the disk is raised from the plate is small, the disk may be brought into contact with the plate. Further, the arm easily vibrates because it is supported on one side. When the vibration is increased due to the occurrence of resonance, focusing and tracking in the pickup may be interfered with.

SUMMARY OF THE INVENTION

The present invention has been made in view of the above-mentioned circumferences and has for its object to provide a disk chucking mechanism having a small thickness and having a structure simplified by obtaining a driving force for clamping and unclamping a disk from the existing mechanism, and improve the reliability or the like of a disk player having a structure in which plates in a magazine are separated from each other upward and downward.

A disk chucking mechanism according to the present invention is characterized in that a claw member so provided as to protrude and retract from the upper surface of a disk table rotated by rotary driving means for clamping a disk through its center hole at the time of the protrusion, while unclamping the disk at the time of the retraction and performs a clamping/unclamping operation in synchronism with pickup moving means for moving a pickup.

In the above-mentioned structure, the claw member protrudes and retracts from the upper surface of the disk table to clamp the disk, eliminating the necessity of a rotatable driven portion for pressing the disk from above, whereby the disk chucking mechanism can be made thin. A force for unclamping and clamping by the claw member is applied by the existing pickup moving means, whereby the structure of the disk chucking mechanism can be simplified, as compared with a structure in which there is provided a mechanism for applying a driving force for unclamping and clamping apart from the pickup moving means.

More specifically, a disk chucking mechanism comprises a disk table, on which a disk provided with a center hole is put, rotated by rotary driving means, a claw member so provided as to protrude and retract from the upper surface of the disk table for clamping the disk through the center hole at the time of the protrusion, while unclamping-the disk at the time of the retraction, a chuck movable portion slidably provided along the axis of rotation of the disk table for causing the claw member to protrude and retract by the sliding, urging means for urging the chuck movable portion in the direction in which the claw member protrudes, pickup moving means for moving a pickup, and a chuck control mechanism moved upon being pressed by a pressing member provided in the pickup in the position where the pickup is in close proximity to the disk table for sliding the chuck movable portion in the direction in which the claw member retracts.

In a disk player comprising a magazine containing a plurality of plates in which a plurality of disks are loaded one at a time, a pickup arm which is equipped with a disk table, a disk chucking mechanism and a pickup, movement driving means for driving the movement of the pickup arm, and plate separating means for moving the plates upward and downward to enter a state where the pickup arm can enter the magazine, a disk player according to the present invention is characterized by comprising vibration restraining means for holding the disk positioned below the pickup arm in synchronism with the movement of the pickup arm toward the plates (toward the position for reproduction).

In this structure, even in cases such as a case where the disk player is used as an on-vehicle equipment, it is possible to prevent the situations where the disk positioned below the pickup arm jumps by the vibration of a vehicle to come into contact with the pickup arm because the vibration restraining means is provided.

In a disk player comprising a magazine containing a plurality of plates in which a plurality of disks are loaded one at a time, a pickup arm which is equipped with a disk table, a disk chucking mechanism and a pickup, movement driving means for driving the movement of the pickup arm, and plate separating means for moving the plates upward and downward to enter a state where the pickup arm can enter the magazine, a disk player according to the present invention is characterized in that a projection is formed in a side part of each of the plates, the plate separating means comprises a slide plate provided slidably backward and forward, and the slide plate has a first sharp edge and a second sharp edge, and is so constructed as to successively assume a first state where the first sharp edge is caused to face the vicinity of a lower part of the projection of the plate on which the selected disk is put by a sliding operation, a second state where the plate on which the selected disk is put and all the plates in steps above the plate are raised uppermost by the first sharp edge, a third state where the plate on which the selected disk is put and all the plates in the steps above the plate are slightly lowered from the second state, to put the selected disk onto the disk table, and the second sharp edge is caused to face the vicinity of a lower part of the projection of the plate in the step above the plate on which the selected disk is put, and a fourth state where the plate on which the selected disk is put is slightly lowered from the third state, to separate the plate from the selected disk, while the plate in the step above the plate is raised from the third state by the second sharp edge.

In this construction, an operation for separating the plates (allowance of the entrance of the pickup arm), an operation for putting the disk on the disk table, and an operation for raising the disk from the plate can be continuously performed in this order by moving the slide plate in one direction, and the operations are continuously performed in the reverse order by moving the slide plate in the opposite direction.

In a disk player comprising a magazine containing a plurality of plates in which a plurality of disks are loaded one at a time, a pickup arm which is equipped with a disk table, a disk chucking mechanism and a pickup, rotary driving means for horizontally rotating the pickup arm with its one end pivoted, to move the pickup arm from the position where it is contained to the position for reproduction, and plate separating means for moving the plates upward and downward to enter a state where the pickup arm can enter the magazine, a disk player according to the present invention is characterized by further comprising restraining means for restraining the variation in the position of the pickup arm in the position for reproduction.

In this construction, it is possible to prevent the pickup arm from being inclined or vibrating at the time of the reproduction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a plan view showing the player according to the present invention in a state where a player main body portion is removed;

FIG. 9 is a plan view of a player main body portion in the present invention;

FIG. 10A is a right side view of the player main body portion in the present invention, and FIG. 10B is a side view showing its left side surface viewed in perspective from its right side surface;

FIG. 11A is a diagram showing a slidable plate for plate separation 511 in the present invention, and FIG. 11B is a diagram showing a slidable plate for plate separation 512 in the present invention;

FIG. 12A is a diagram showing plates in a magazine in a first state of the present invention, FIG. 12B is a diagram showing a disk chucking mechanism in the first state, and FIG. 12C is a diagram showing the relationship between a slidable plate for plate separation and a projection in the first state;

FIG. 13A is a diagram showing plates in a magazine in a second state of the present invention, FIG. 13B is a diagram showing a disk chucking mechanism in the second state, and FIG. 13C is a diagram showing the relationship between a slidable plate for plate separation and a projection in the second state;

FIG. 14A is a diagram showing plates in a magazine in a third state of the present invention, and FIG. 14B is a diagram showing the relationship between a slidable plate for plate separation and a projection in the third state;

FIG. 15A is a diagram showing plates in a magazine in a fourth state of the present invention, and FIG. 15B is diagram showing the relationship between a slidable plate for plate separation and a projection in the fourth state;

FIG. 20 is a cross-sectional view of a chuck rotating mechanism in the present invention (a disk unclamped state);

FIG. 21 is a cross-sectional view of a chuck rotating mechanism in the present invention (a disk clamped state);

FIG. 23 is a perspective view showing the internal structure of a disk player in the present invention comprising a mechanism for preventing the pickup arm from vibrating;

DESCRIPTION OF THE PREFERRED EMBODIMENTS

Figure 1:
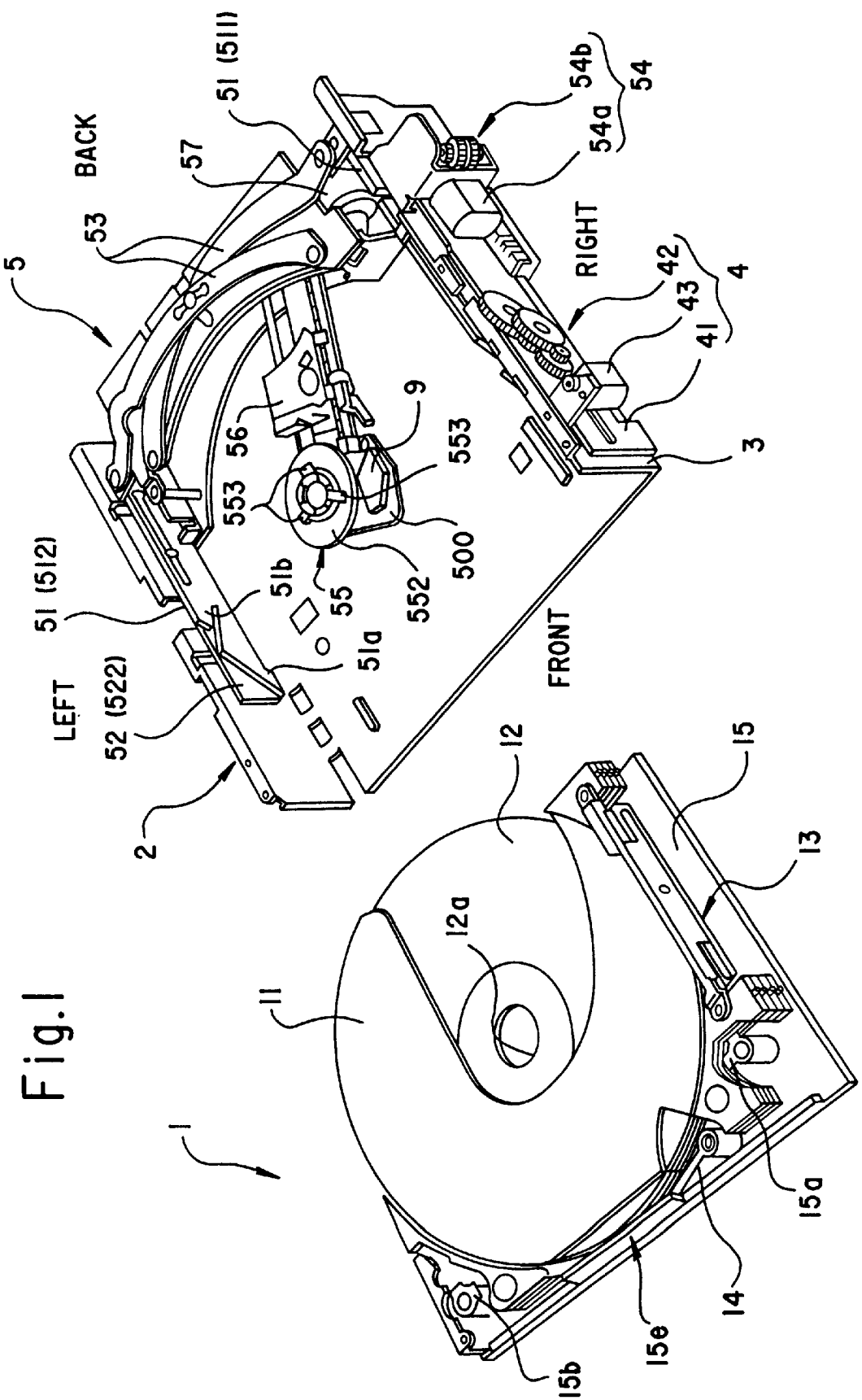
FIG. 1 is a perspective view showing the internal structure of a disk player according to the present invention.

Description is now made of embodiments of the present invention on the basis of drawings.
(Schematic Description)
Schematic description is now made on the basis of a perspective view of FIG. 1. A disk player according to the present embodiment comprises a magazine 1 and a player portion 2. At the time of playing, the magazine 1 is loaded in the player portion 2. The magazine 1 is provided with four plates 11. A disk 12 can be put on each of the plates 11. Each of the plates 11 is so provided as not to slide but move upward and downward with an upper cover (not shown).

The player portion 2 comprises a player chassis 3, an elevator mechanism 4, and a player main body portion 5. A containing space containing the magazine 1 is provided in the. front of the player chassis 3, and the player main body portion 5 is arranged behind the containing space of the chassis 3.

When the magazine 1 is loaded in the player portion 2, to perform an operation for selecting the disk, the player main body portion 5 is moved upward and downward by the elevator mechanism 4, and is stopped in a position corresponding to the selected disk. Slidable plates for plate separation 51 (511, 512) provided on both sides of the player main body portion 5 advance forward, and the plate 11 on which the selected disk 12 is put and all the plates 11 in steps above the plate 11 are raised by a first sharp edge 51a. Thereafter, a pickup arm 500 stored in the player main body portion 5 is horizontally rotated, and a chuck rotating mechanism 55 arranged at an end of the pickup arm 500 is positioned below a center hole 12a of the selected disk 12. Further, the slidable plates for plate separation 51 further advance. Consequently, the plate 11 on which the selected disk 12 is put is lowered so that the disk 12 is put on a disk table 552 in the chuck rotating mechanism 55 by a second sharp edge 51b, and the selected disk 12 is clamped in the center hole 12a by a chuck claw 553 in the chuck rotating mechanism 55. The plate 11 is separated downward from the selected disk 12, and the plate 11 in the step above the plate 11 is separated upward from the selected disk 12 upon being pushed up. Thereafter, a pickup 56 provided in the pickup arm 500 is moved along the radius of the disk 12, to read information in a predetermined position of the disk 12.
(Specific construction)
The respective components will be specifically described.

Figure 2:
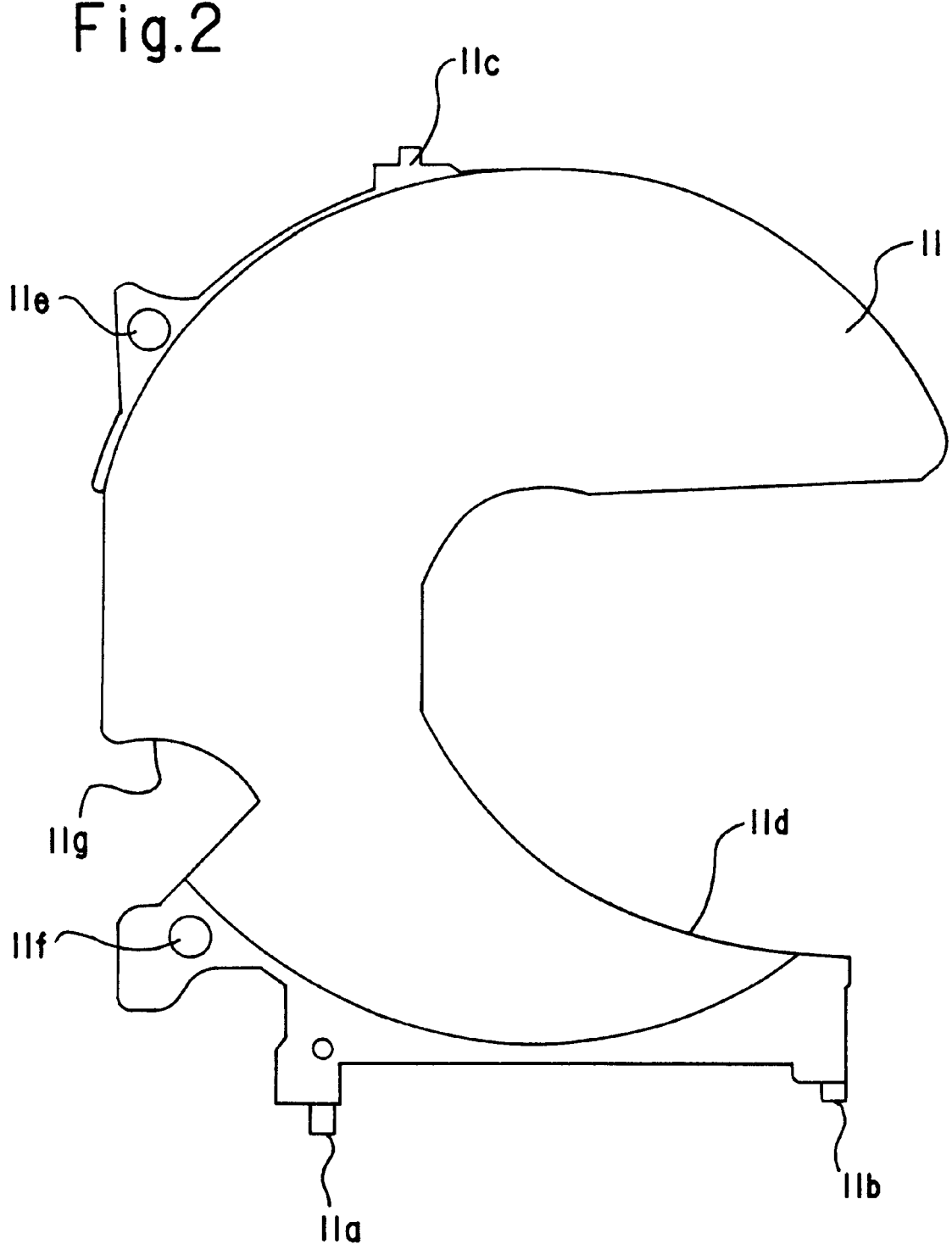
FIG. 2 is a plan view showing a plate in the present invention.

FIG. 2 is a plan view of the plate 11. A cut-away portion 11d in a shape corresponding to the rotation range or the like of the pickup arm 500, a fan-shaped notch 11g, and guide holes 11e and 11f for guiding elevation are formed in the plate 11. Further, a pin 11a and a pin 11b are formed with spacing at an edge on the lower side of FIG. 2 (the right side in the disk player), and a pin 11c is formed at an edge on the upper side of FIG. 2 (the left side in the disk player). The pins 11a, 11b and 11c are operated by the slidable plates for plate separation 51 (511, 512). Further, the lengths at which the pin lha and the pin 11b protrude are made slightly different from each other. The pins 11a and 11b can receive an operating force of the slidable plate for plate separation 51 (511). Projections 11h, 11h and 11h are formed in the same arrangement as that of the pins 11a, 11b and 11c even in an upper cover of the magazine 1 (see FIGS. 4 and 5).

Figure 3:
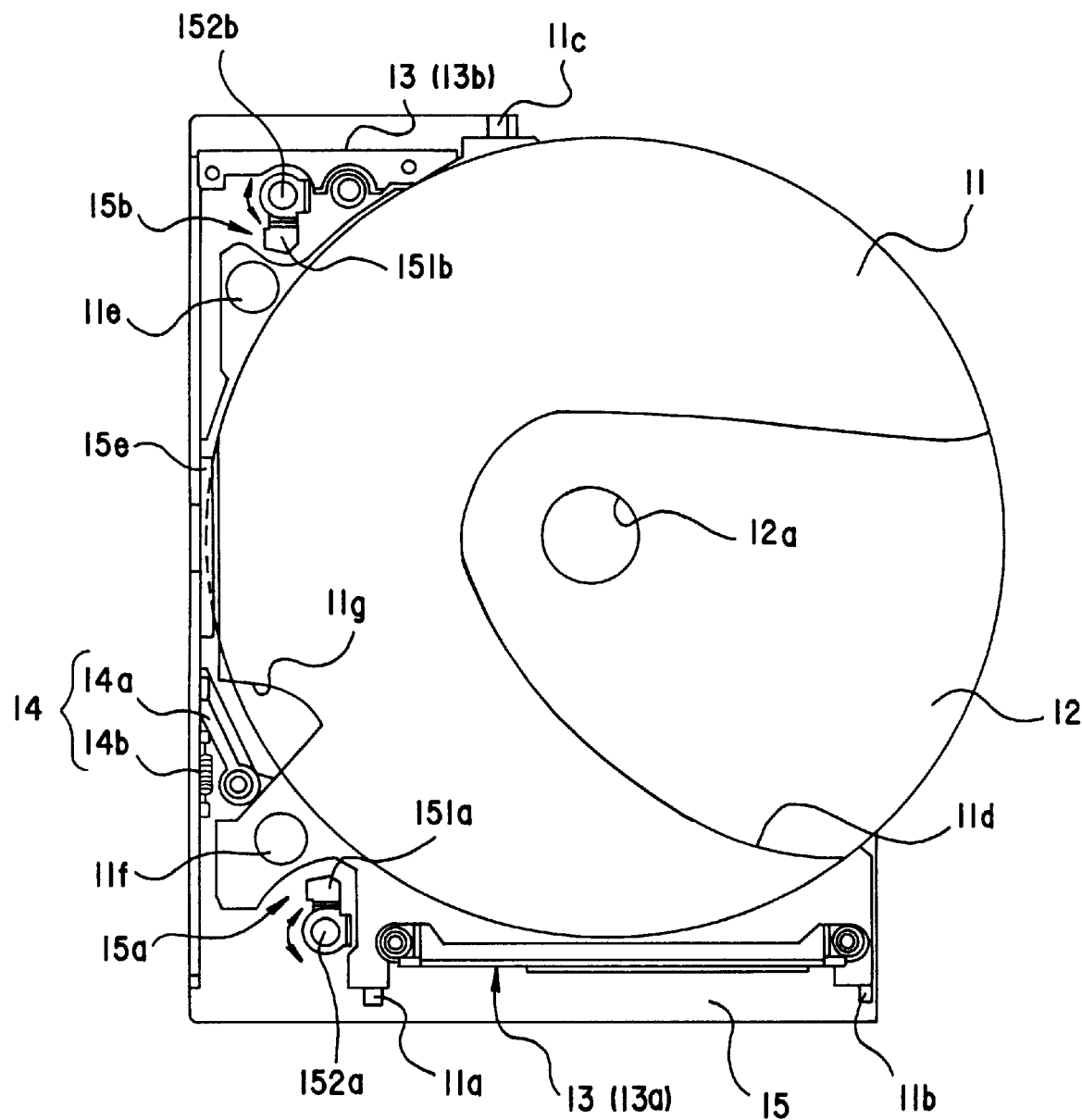
FIG. 3 is a plan view showing a magazine in the present invention in a state where its upper cover is removed.
Figure 22A:
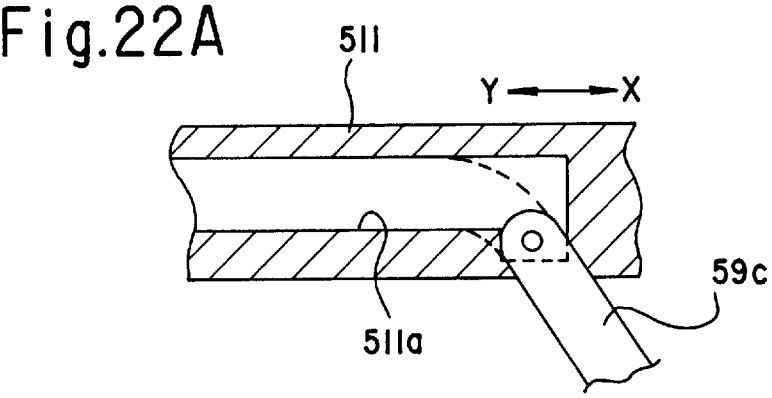
FIG. 22A is an enlarged view of a principal part.

FIG. 3 is a plan view showing the magazine 1 in a case where its upper cover is removed. Disk ejecting means 14 is provided in a position on a bottom plate 15 of the magazine 1 and corresponding to the notch 11g in a fan shape. The disk ejecting means 14 comprises an ejecting lever 14a for pressing a rear part of the disk 12 by the rotation and a spring 14b for urging the ejecting lever 14a toward the non-ejecting side. Steps for supporting the disk 12 are formed in a vertical portion 15e in the rear of the bottom plate 15 (see FIGS. 1, 4 and 22). An upper cover (not shown) is moved upward and downward as the plate 11 is moved upward and downward. Separation restricting members 15a and 15b are provided on the bottom plate 15 in order to prevent, in a state where the magazine 1 is separated from the player portion 2, the vertical movement, that is, separation.

Figure 6:
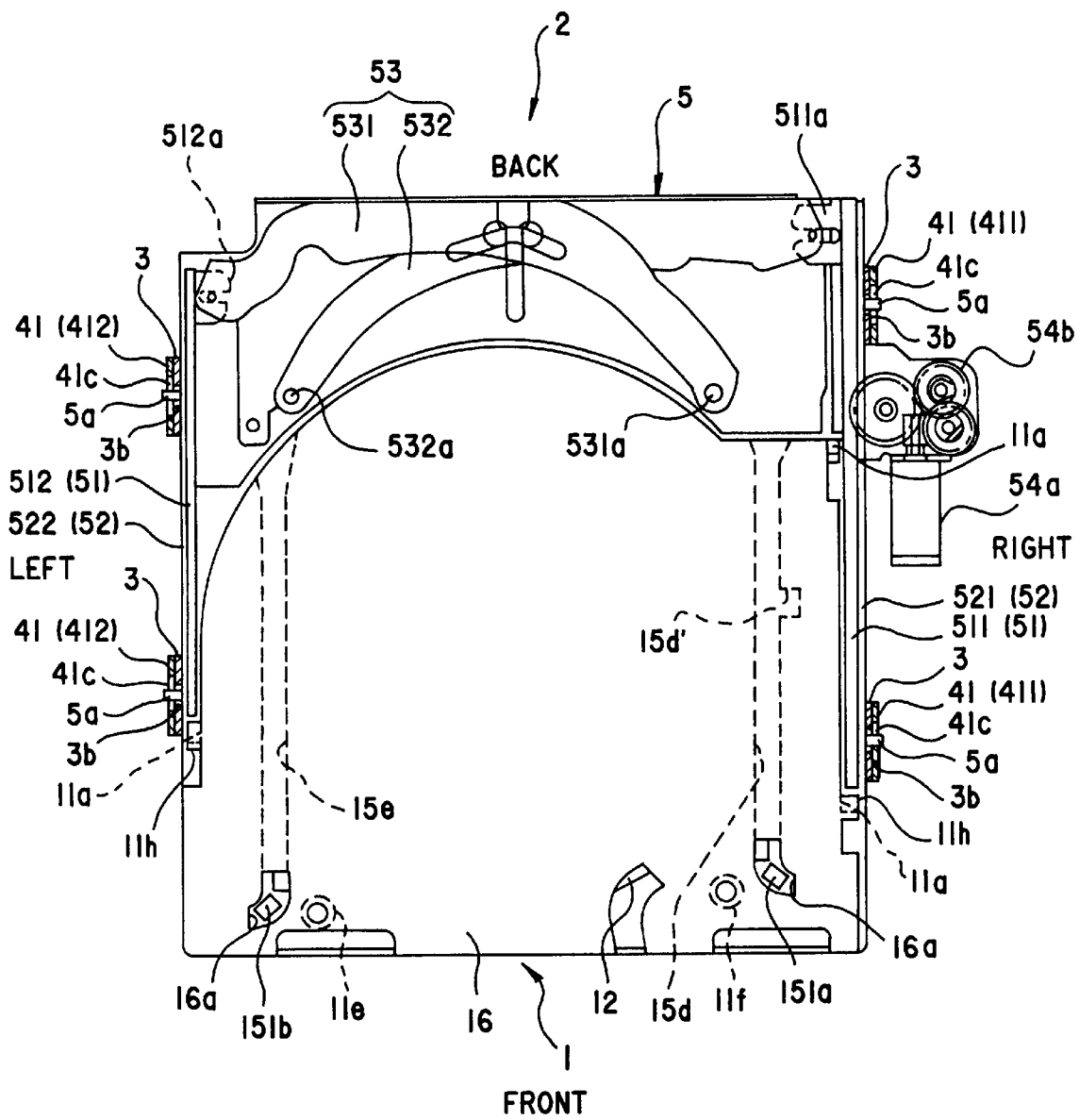
FIG. 6 is a plan view showing a state where the magazine is loaded in a player according to the present invention.

The separation restricting members 15a and 15b are respectively rotatable in directions indicated by arrows as shown by means of shafts 152a and 152b. In a state where restricting chips 161a and 151b are positioned as shown in FIG. 3, the vertical movement of the upper cover is restricted. When the magazine 1 is loaded in the player portion 2, the separation restricting members 15a and 15b are rotated, so that the restriction of separation by the restricting chips 151a and 151b is released, as shown in FIG. 6. Supplementary explanation will be made later. The magazine 1 has parallel elevation auxiliary means 13 for raising and lowering the upper cover in parallel provided on both sides so that the plates 11 are raised and lowered with their respective parallel states maintained.

Figure 4A:
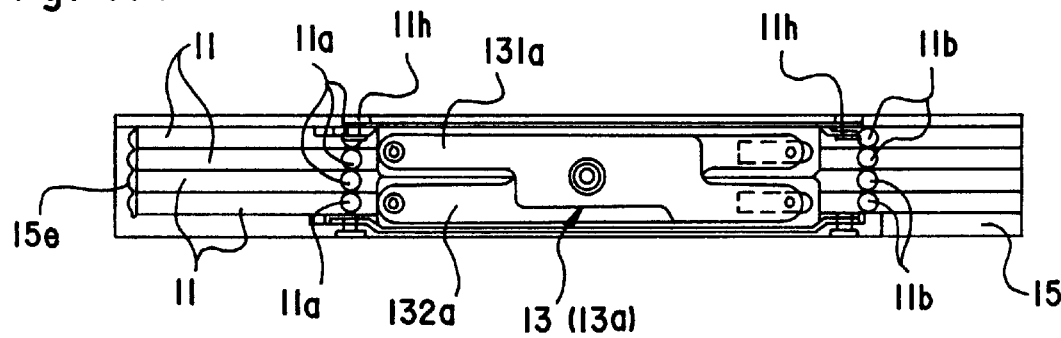
FIG. 4A is a side view showing the magazine in the present invention, which illustrates a state where plates are not separated from each other.
Figure 4B:
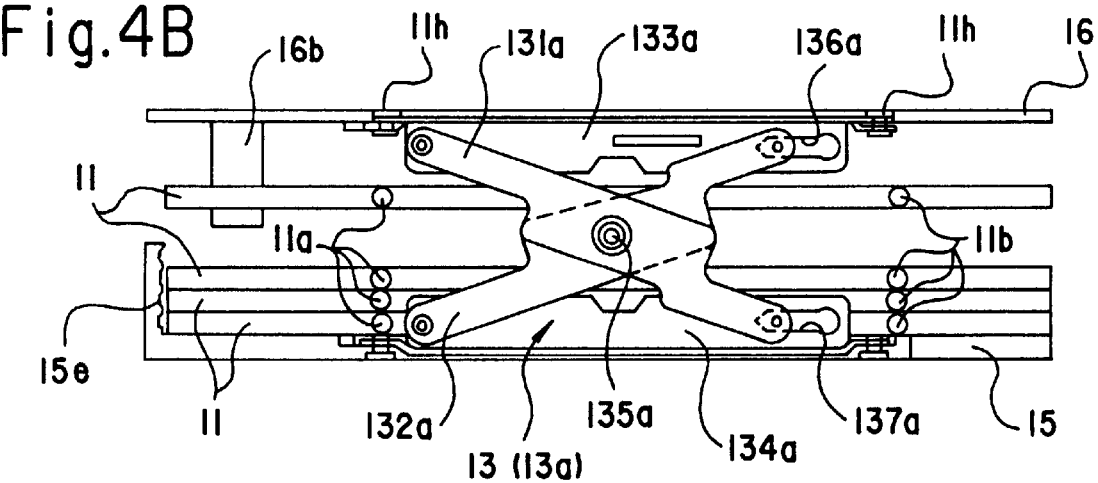
FIG. 4B is a side view showing the magazine in the present invention, which illustrates a state where plates are separated from each other.
Figure 5:
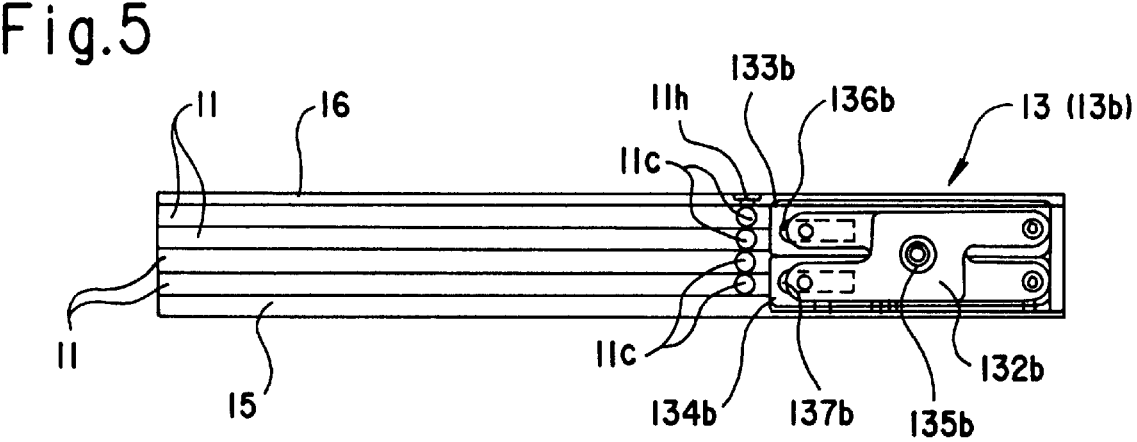
FIG. 5 is another side view of the magazine in the present invention.

FIGS. 4A and 4B are side views showing the magazine 1 as viewed from the parallel elevation auxiliary means 13a on one side, and FIG. 5 is a side view showing the magazine 1 as viewed from the parallel elevation auxiliary means 13b on the other side. FIG. 4B illustrates a state where the plates are separated from each other.

A side plate 134a of the parallel elevation auxiliary means 13a is provided at the side of the bottom plate 15 of the magazine 1, and a side plate 133a is provided at the side of the upper cover 16. Guide holes 136a and 137a which extend in the horizontal direction are respectively formed in the side plates 133a and 134a. The bottom plate 15 and the upper cover 16 are connected to each other by a first connecting plate 131a and a second connecting plate 132a which are rotated by means of a shaft 135a and are provided in a cross shape. Specifically, one end of the first connecting plate 131a and the other end thereof are respectively connected to the side plate 133a and the guide hole 137a of the side plate 134a, and one end of the second connecting plate 132a and the other end thereof are respectively connected to the side plate 134a and the guide hole 136a of the side plate 133a.

A side plate 134b of the parallel elevation auxiliary means 13b is provided at the side of the bottom plate 15 of the magazine 1, and a side plate 133b thereof is provided at the side of the upper cover 16. Guide holes 136b and 137b which extend in the horizontal direction are respectively formed in the side plates 133b and 134b. The bottom plate 15 and the upper cover 16 are connected to each other by a first connecting plate 131b and a second connecting plate 132b which are rotated by means of a shaft 135b and are provided in a cross shape. Specifically, one end of the first connecting plate 131b and the other end thereof are respectively connected to the side plate 133b and the guide hole 137b of the side plate 134b, and one end of the second connecting plate 132b and the other end thereof are respectively connected to the side plate 134b and the guide hole 136b of the side plate 133b.

Consequently, in a state where the restriction of separation by the separation restricting members 15a and 15b is released, when an upward force is applied to the upper cover 16, the connecting plates 131a, 131b, 132a, and 132b rise with their respective ends along the guide holes 136a, 136b, 137a, and 137b, whereby the upper cover 16 is moved in parallel. Guide cylinders 16b and 16b are respectively formed so as to correspond to the guide holes 11e and 11f in the upper cover 16, and the plate 11 rises and falls upon being guided by the guide cylinders 16b and 16b.

FIG. 6 is a plan view showing a state where the magazine 1 is loaded in the magazine 1 containing space of the player portion 2. FIG. 7 is a plan view, from which the magazine 1 and the player main body portion 5 are removed, mainly showing the player chassis 3 and the elevator mechanisms 4 arranged on both its side surfaces. Two grooves 15d and 15e are formed in the back-and-forth direction on the reverse surface of the bottom plate 15 of the magazine 1. When the magazine 1 is contained in the player portion 2, the grooves 15d and 15e and guide projections 3c, 3c and 3c' formed in the player chassis 3 are engaged with each other.

A lock plate 6 for locking the magazine 1 is provided on the reverse surface of the player chassis 3. A first projection 6a protruding into the containing space is guided into a guide hole 3e extending in the longitudinal direction which is formed in the player chassis 3, and a second projection 6b protruding into the same containing space is guided into an L-shaped guide hole 3d which extends in the back-and-forth direction and is bent rightward as its rear end between the guide projections 3c and 3c (that is, a position corresponding to the groove 15d).

The lock plate 6 is urged forward by a spring 6c. When the magazine 1 is loaded in the containing space, the first projection 6a is pressed against the urging of the spring 6c at its rear end, so that the lock plate 6 is moved backward as shown in FIG. 7. Consequently, the second projection 6b enters the rightward bent portion of the guide hole 3d. The rightward bent portion is in a position corresponding to an engaging groove 15d' (see FIG. 6) of the groove 15d in the magazine 1. The second projection 6b enters the engaging groove 15d', to lock the magazine 1. The locked state of the magazine 1 is detected by a switch 100 pressed by the lock plate 6.

Circular arc holes 16a and 16a corresponding to the rotation ranges of restricting chips 151a and 151b in the above-mentioned separation restricting members 15a and 15b are formed in the upper cover 16 of the magazine 1. The separation restricting members 15a and 15b respectively have engaging members (not shown) protruding toward the grooves 15d and 15e. When the magazine 1 is loaded in the player containing space, therefore, the engaging members are respectively pressed by the guide projection 3c' and the guide projection 3c on the front side in the figure, so that the separation restricting members 15a and 15b are rotated. The restricting chips 151a and 151b are positioned in the circular arc holes 16a and 16a so as not to engage the upper cover 16, to allow the vertical movement of the upper cover 16, as shown in FIG. 6.

Furthermore, FIG. 6 shows how four guide projections 5a protruding from side surfaces of the player main body portion 5 are respectively engaged with vertical guide grooves 3b in the player chassis 3 and step-shaped grooves 41c of the elevating slide plates 41 in the elevator mechanism 4. In the player main body portion 5, when the elevating slide plates 41 slide back and force, a position at the height at which the guide projection 5a is supported is changed in the step-shaped groove 41c, and the guide projection 5a is moved in the vertical guide groove 3b by the change. Therefore, the player main body portion 5 rises and falls.

Figure 8A:
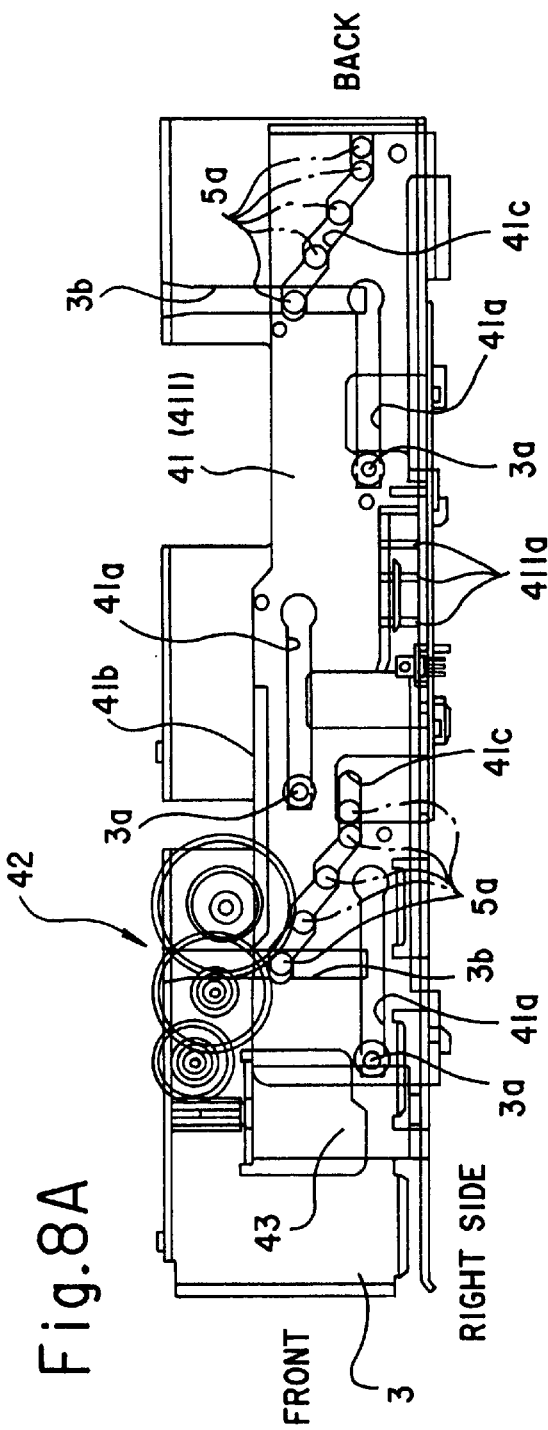
FIG. 8A is a right side view of the player according to the present invention.
Figure 8B:
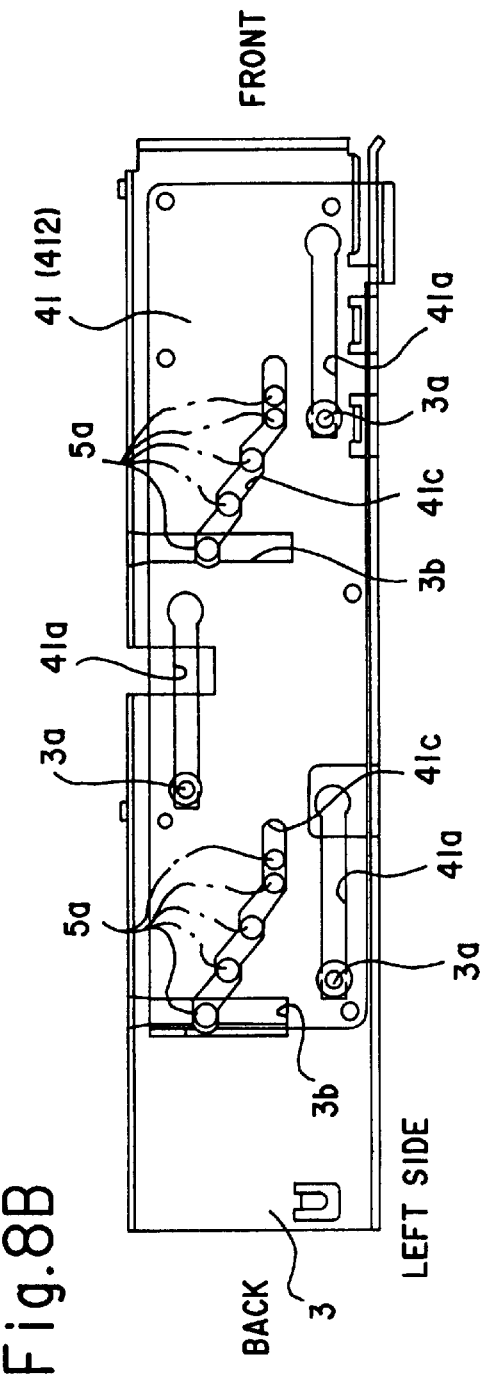
FIG. 8B is a left side view of the player according to the present invention.

FIG. 8A is a right side view of the player portion 2, and FIG. 8B is a left side view thereof. The elevating slide plates 41 in the elevator mechanism 4 are arranged on its side surfaces. The elevating slide plate 41 on the right side is denoted by reference numeral 411, and the elevating slide plate 41 on the left side is denoted by reference numeral 412. Guide holes 41a are respectively formed in the back-and-forth direction in the elevating slide plates 41 (411, 412), so that the elevating slide plates 41 are moved upon being guided backward and forward by a projection 3a protruding from a side surface of the player chassis 3. A rack 41b is formed at an upper edge of the elevating slide plate 411, and a predetermined gear in a group of gears 42 is engaged with the rack 41b.

A driving force of a drive motor 43 is applied to the elevating slide plate 411 through the group of gears 42, and the elevating slide plate 411 is moved backward and forward. The back-and-forth movement of the elevating slide plate 411 is transmitted to the other elevating slide plate 412 through a synchronous connecting lever 44 shown in FIG. 7.

The synchronous connecting lever 44 is so constructed as to be horizontally rotated by means of a shaft 44a. If the elevating slide plate 411 advances forward, the elevating slide plate 412 advances backward. Since the travel directions of both the elevating slide plates are opposite to each other, the step-shaped grooves 41c of the elevating slide plates 411 and 412 are opposite to each other in upward and downward directions. FIG. 8 virtually shows how the upper and lower positions of the guide projection 5a are changed in correspondence to respective steps of the step-shaped groove 41c.

Although the player main body portion 5 is raised and lowered by the back-and-forth movement of the elevating slide plate 411, the raised and lowered state (which disk corresponds to the height of the player main body portion 5) can be known by detecting slits 411a formed with predetermined spacing in the back-and-forth direction in the elevating slide plate 411 using a photosensor 102 (see FIG. 7).

When the elevating slide plate 411 advances forwardest, the lock plate 6 is pushed by an operating member (not shown) of the elevating slide plate 411, so that the magazine 1 is ejected. The position of the elevating slide plate 411 is judged by the photosensor 102 as described above. For this purpose, a reference point must be determined. A switch 101 shown in FIG. 7 is provided for this purpose, and is so set that the slide plate 411 is operated by a pressing member 411b when it is in a position corresponding to a portion between the third and fourth disks. After the operation, therefore, if the slide plate 411 is further moved, to detect an output of the photosensor 102, it is found that the slide plate 411 is in a position corresponding to the fourth disk. The slide plate 411 may, in some cases, be in a position corresponding to the third disk depending on the direction in which it is moved. If the direction in which the slide plate is moved is previously determined, however, it is found that the slide plate is in any position.

FIG. 9 is a plan view of the player main body portion 5. The slidable plates for plate separation 51 are respectively provided slidably backward and forward inside case side plates 52 in the player main body portion 5. The case side plate on the right side is denoted by reference numeral 521, and the case side plate on the left side is denoted by reference numeral 522. The slidable plate for plate separation on the right side is denoted by reference numeral 511, and the slidable plate for plate separation on the left side is denoted by reference numeral 512.

A driving plate mechanism 53 for synchronously driving the slidable plates for plate separation 511 and 512 is provided on the upper surface of the player main body portion 5. The driving plate mechanism 53 comprises connection operating levers 531 and 532. A right end (on the side of a functional end) of the connection operating lever 532 is connected to an upper surface portion at a rear end of the slidable plate for plate separation 511, and is rotated around a fulcrum 532a at a left end of the connection operating lever 532 by the back-and-forth movement of the slidable plate for plate separation 511. On the other hand, a left end (on the side of a functional end) of the connection operating lever 531 is connected to an upper surface portion at a rear end of the slidable plate for plate separation 512, and is rotated around a fulcrum 531a at a right end of the connection operating lever 531, to move the slidable plate for plate separation 512 backward and forward.

The connection operating levers 531 and 532 are connected to each other by a connecting pin 53a passing through long holes 531b and 532b formed in their respective central parts. When the slidable plate for plate separation 511 is moved, therefore, the connection operating lever 532 is moved. When the connection operating lever 532 is moved, the connection operating lever 531 is moved through the connecting pin 53a. When the connection operating lever 531 is moved, the slidable plate for plate separation 512 is moved. The connecting pin 53a is guided by a guide hole 53b so formed as to extend in the back-and-forth direction on the upper surface of the player main body portion 5.

A rack 514 is formed on an outer side surface of the slidable plate for plate separation 511. A predetermined gear in the group of gears 54b is engaged with the rack 514. A driving force of the drive motor 54a is applied to the slidable plate for plate separation 511 through the group of gears 54b. The slidable plate for plate separation 511 is moved backward and forward, and the other slidable plate for plate separation 512 is also moved backward and forward with the back-andforth movement of the slidable plate 511.

FIG. 10A is a right side view of the player main body portion 5, and FIG 10B is a side view showing its left side surface viewed in perspective from its right side surface.

FIGS. 11A and 11B are explanatory views showing the relationship between the slidable plates for plate separations 51 (511, 512) and projections 11a, 11b and 11c of the plates 11, and shows, when the disk put on the third plate 11 from the bottom is selected, the slidable plates for plate separation 51 which are inherently moved backward and forward upon being fixed for convenience, and the position where the plate 11 which is not inherently moved backward and forward protrudes upon being changed.

FIGS. 12A, 12B, and 12C illustrate a state occurring immediately before the plates are separated from each other in a case where the disk put on the third plate 11 from the bottom is selected (a state in a point of time that the magazine 1 is loaded in the containing space), and FIGS. 13A, 13B, 13C, 14A, 14B, 15A, and 15B illustrate a state where the plate 11 is raised and lowered in synchronism with the movement of the slidable plates for plate separation 51 which is assumed subsequently to the state shown in FIG. 12.

Inclined surfaces for plate separation corresponding to the projections 11a and the projections. 11b of the plate 11 are formed on the slidable plate for plate separation 511. The inclined surface for plate separation corresponding to the projections 11a of the plate 11 is formed on an inner side surface at a rear end of the slidable plate for plate separation 511. Parts of the inclined surfaces for plate separation corresponding to the projections 11a and 11b will be described in the order from the front.

Upward inclined surfaces 511b and 511f in the first sharp edge 51a ensure such a space as to receive the pickup arm 500 between the plate 11 on which the selected disk is put and the plate 11 in the step below the plate at their uppermost points (see FIGS. 13A, 13B, and 13C).

First downward inclined surfaces 511c and 511g connecting with the upward inclined surfaces 511b and 511f ensure such a space as to be equipped with the selected disk 12 on the chuck rotating mechanism 55 in the received pickup arm 500 at their lowermost points (see FIGS. 14A and 14B).

Second downward inclined surfaces 511d and 511h connecting with the first downward inclined surfaces 511c and 511g separate the plate 11 on which the selected disk 12 is put downward from the selected disk 12. (see FIGs, 15A and 15B).

Upward inclined surfaces 511e and 511i in the second sharp edge 51b separates the plate 11 in the step above the plate 11 on which the selected disk is put from the selected disk 12 at their uppermost points (see FIGS. 15A and 15B).

Similarly, an inclined surface for plate separation corresponding to the projections 11c of the plate 11 is formed on the slidable plate for plate separation 512. Parts of the inclined surface for plate separation will be described in the order from the front. An upward inclined surface 512b in the first sharp edge 51*a* ensures such a space as to receive the pickup arm 500, a first downward inclined surface 512*c* ensures such a space as to be equipped with the disk 12 on the chuck rotating mechanism 55 in the received pickup arm 500, a second downward inclined surface 512*d* separates the plate 11 on which the selected disk 12 is put from the selected disk 12, and an upward inclined surface 512*e* in the second sharp edge 51*b* separates the plate 11 in the step above the selected disk 12 from the selected disk 12.

Respective states in the slidable plates for plate separation 51 will be described in order.

A state shown in FIG. 12 is a state where the first sharp edge 51*a* is caused to face the vicinities on the lower side of the projections 11*a*, 11*b*, and 11*c* of the plate 11 on which the selected disk 12 is put (a first state).

A state shown in FIG. 13 is a state where the plate 11 on which the selected disk 12 is put and all the plates 11 in the steps above the plate 11 are raised uppermost by the first sharp edge 51*a* (a second state).

A state shown in FIG. 14 is a state where the plate 11 on which the selected disk 12 is put and all the plates 11 in the steps above the plate 11 are slightly lowered from the second state, to put the selected disk 12 on the disk table 552, and the second sharp edge 51*b* is caused to face the vicinities on the lower side of the projections 11*a*, 11*b*, and 11*c* of the plate 11 in the step above the plate 11 on which the selected disk 12 is put (a third state).

A state shown in FIG. 15 is a state where the plate on which the selected disk 12 is put is slightly lowered from the third state, to separate the plate 11 from the selected disk 12, and the plate 11 in the step above the plate 11 is raised from the third state by the second sharp edge 51*b* (a fourth state).

A switch (not shown) operated by the movement of the slidable plate for plate separation 512 is provided in the vicinity of the slidable plate 512. The switch is for detecting the first state to the fourth state in the slidable plate for plate separation 512. When the second state is detected, the pickup arm 500 is rotated toward the magazine 1. When the third state is detected, a clamping operation is performed by a chuck claw 553.

Figure 16:
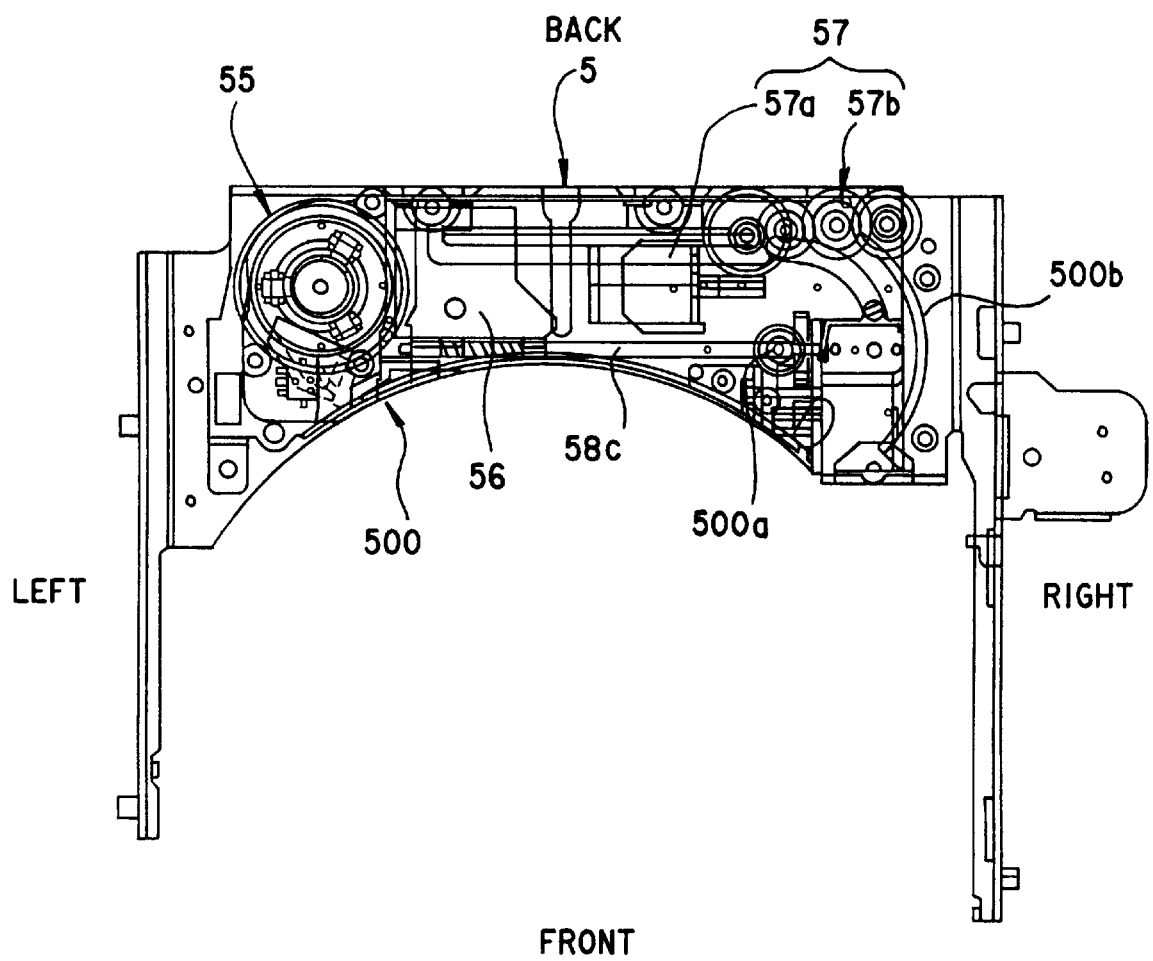
FIG. 16 is a plan view showing in perspective a pickup arm provided in the player main body portion in the present invention.
Figure 17:
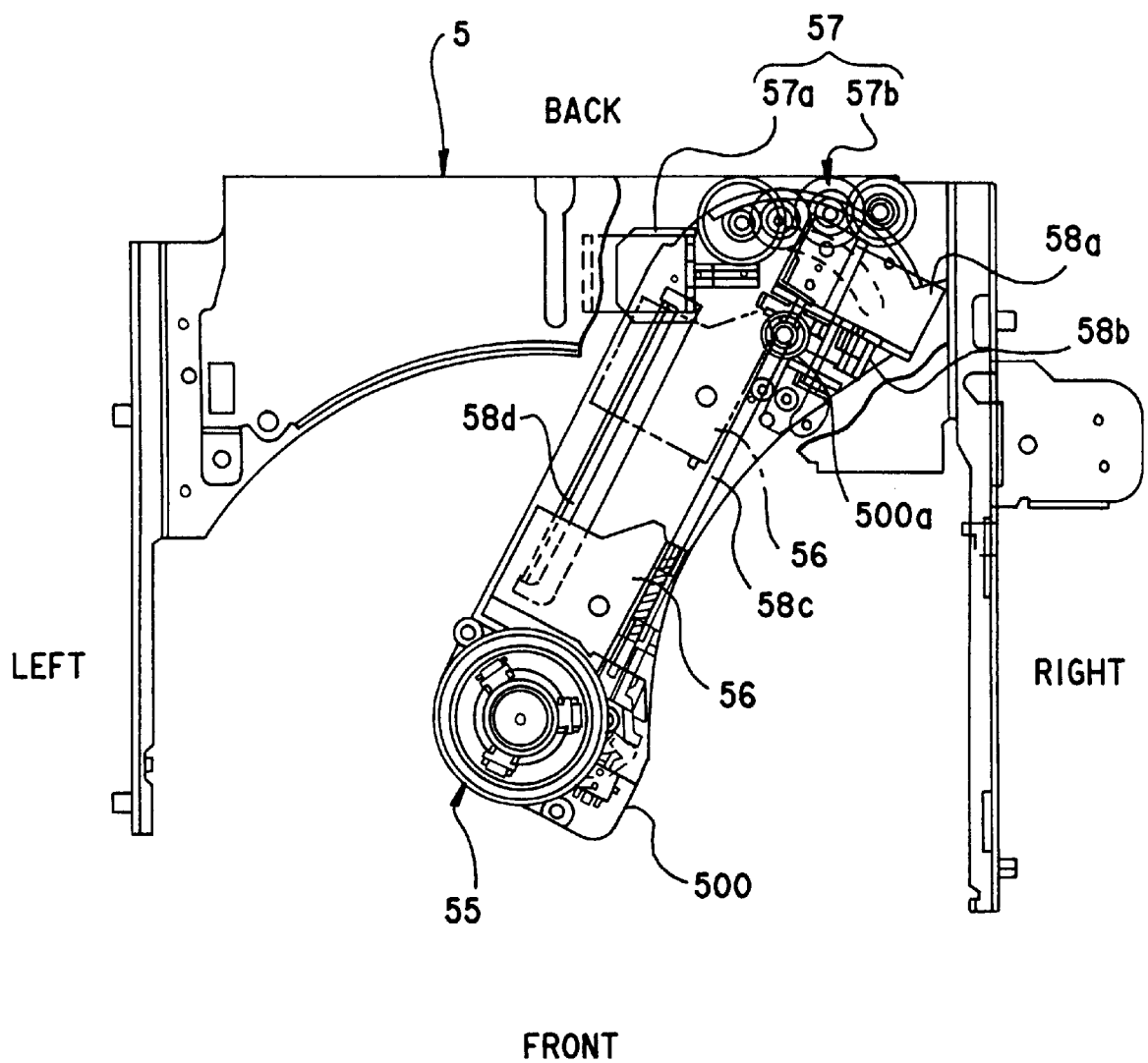
FIG. 17 is a plan view showing a state where the pickup arm is rotated toward the magazine in FIG. 16.

FIG. 16 is a plan view of the player main body portion 5 and is a diagram showing in perspective a portion of the pickup arm 500. A portion in the front of the case of the player main body portion 5 is formed in the shape of a concavely circular arc corresponding to the circular arc of the disk 12. The pickup arm 500 also has a concavely circular arc-shaped portion corresponding to the concavely circular arc, and is entirely contained in the case. The player main body portion 5 is raised and lowered by the elevator mechanism 4 in a state where the pickup arm 500 is entirely contained in the case.

The pickup arm 500 is so provided as to be horizontally rotatable by means of a rotating shaft 500*a*. When the pickup arm 500 is rotated in a counterclockwise direction in FIG. 16, the pickup arm 500 exits from the case, to position the chuck rotating mechanism 55 arranged at its end below the center hole 12*a* of the disk 12. A rack 500*b* is formed in rear end section of the pickup arm 500 in a circular arc shape centered around the rotating shaft 500*a*. A predetermined gear in a group of gears 57*b* in a rotating mechanism 57 is engaged with the rack 500*b*. The group of gears 57*b* receives a driving force from a drive motor 57*a* arranged in the case, to rotate the pickup arm 500.

Figure 18:
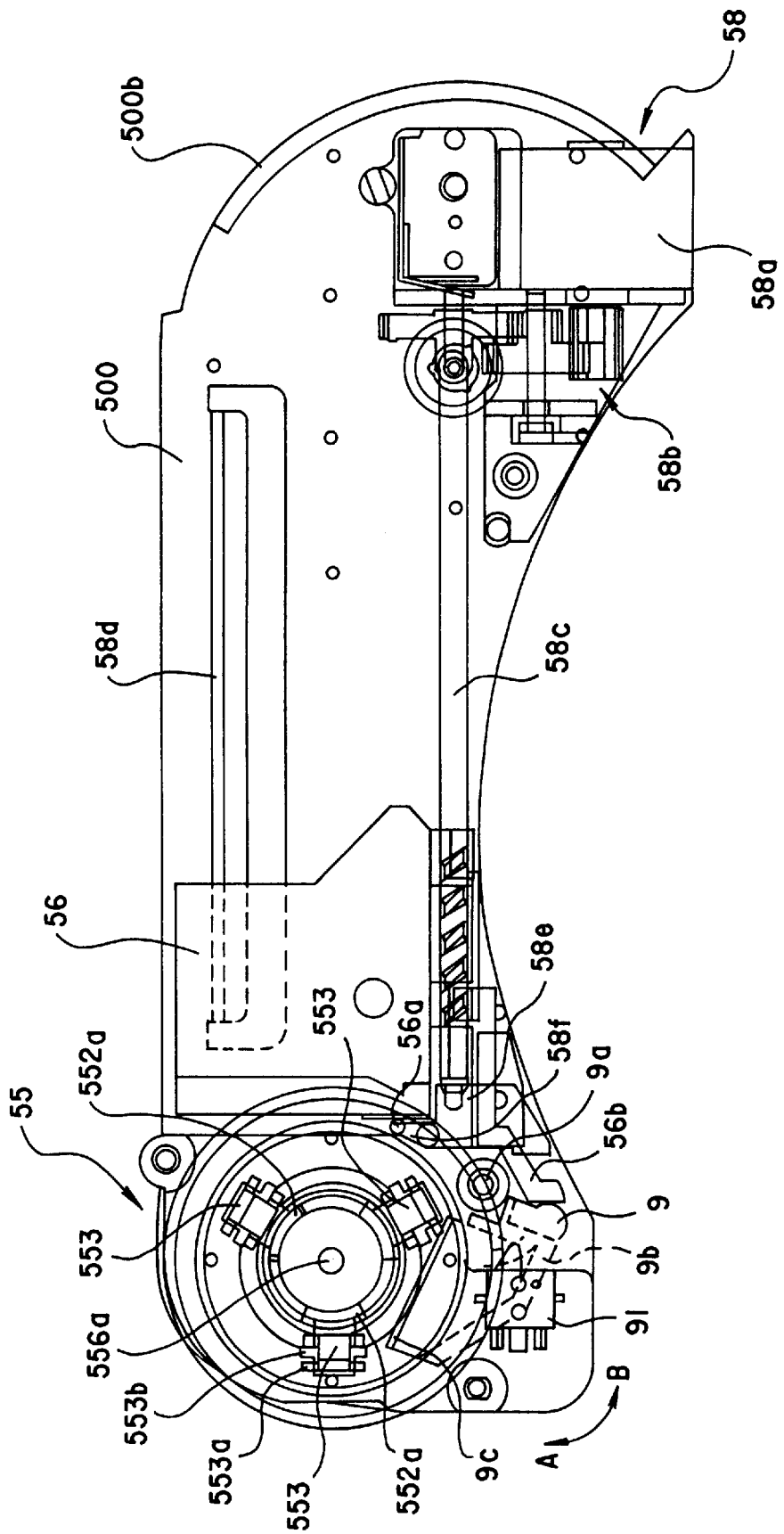
FIG. 18 is an enlarged plan view of the pickup arm in the present invention (a disk unclmaped state)
Figure 19:
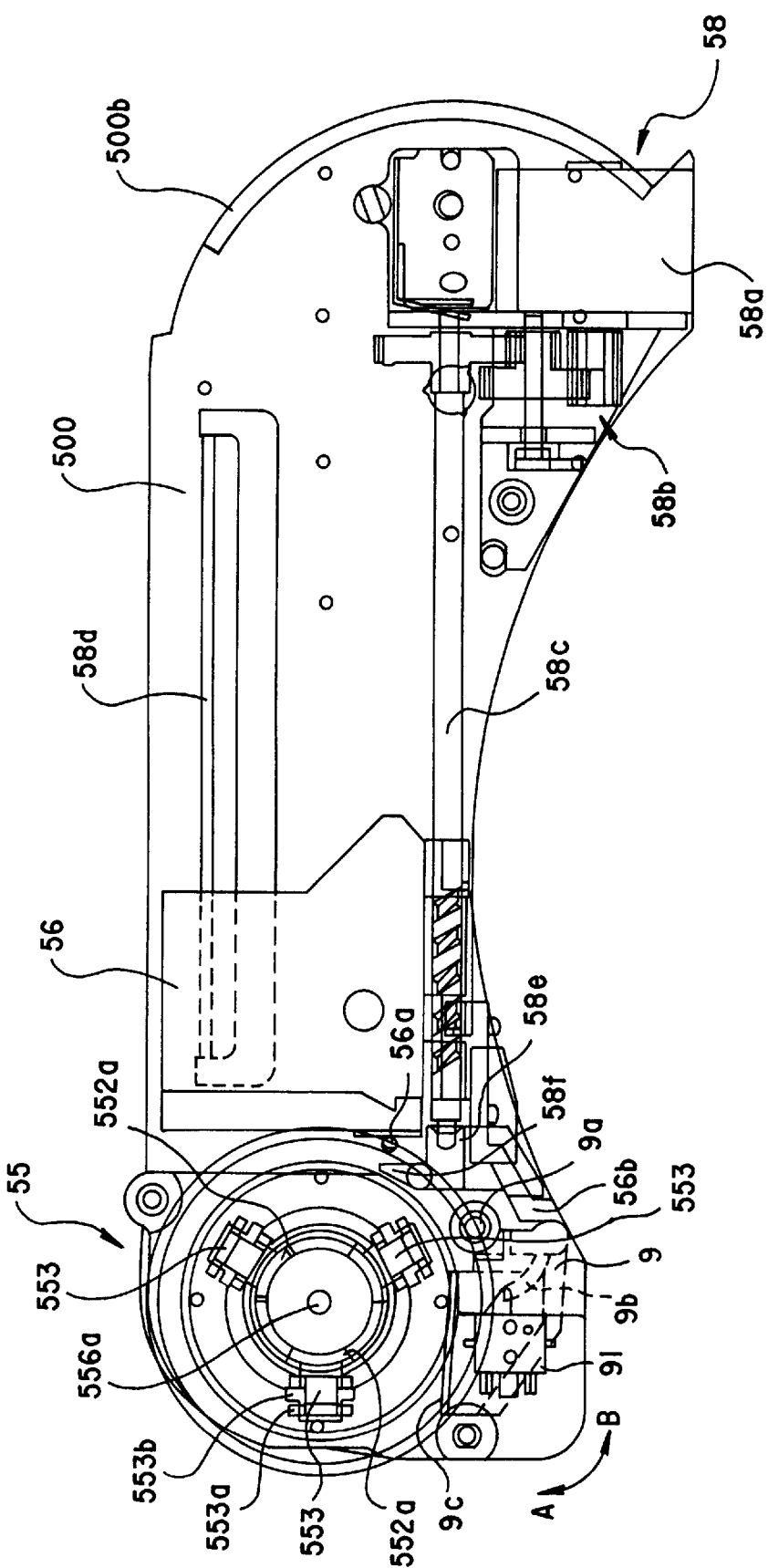
FIG. 19 is an enlarged plan view of the pickup arm in the present invention (a disk clamped state)

FIGS. 18 and 19 are enlarged plan views of the pickup arm 500, where FIG. 18 illustrates an unclamped state in the chuck rotating mechanism 55, and FIG. 19 illustrates a clamped state. The pickup arm 500 is equipped with a pickup 56, a pickup moving mechanism 58, the chuck rotating mechanism 55, and a chuck control mechanism 9. The pickup moving mechanism 58 comprises a screw shaft 58*c* having its one end supported by a supporting member 58*e*, a drive motor 58*a*, and a group of gears 58*b* for transmitting its driving force to the screw shaft 58*c*.

A first switch 56*a* is provided on an end surface of the pickup 56 (an end surface on the side of the chuck rotating mechanism 55). The first switch 56*a* is turned on when it touches a projection 58*f* formed in the supporting member 58*e*. The time point where the first switch 56*a* is turned on corresponds to the time when the chuck rotating mechanism 55 enters an unclamped state by the chuck control mechanism 9, as seen in FIG. 18. The drive motor 58*a* is stopped when the first switch 56*a* is turned on.

The chuck control mechanism 9 is rotated in a direction A in FIGS. 18 and 19 around a shaft 9*a* being pressed by a pressing projection 56*b* mounted on the pickup 56, to perform an unclamping operation in the chuck rotating mechanism 55. The unclamped state is maintained until the pickup arm 500 exits from the case to enter the above-mentioned state shown in FIG. 13. In the stage shown in FIG. 14, the chuck control mechanism 9 enters a clamped state. An instruction to change the chuck control mechanism 9 into the clamped state is issued when the state shown in FIG. 14 (the third state) in the slidable plates for plate separation 51 is detected by a switch (not shown).

Specifically, the drive motor 58*a* moves the pickup 56 toward the outer periphery of the disk by the detection. By the movement of the pickup 56, the chuck control mechanism 9 is rotated in a direction B, to enter a clamped state, as shown in FIG. 19. In a predetermined position in a case where the chuck control mechanism 9 is rotated in the direction B (corresponding to a position where the pickup 56 retreats by approximately 2 mm from the clamped state), a second switch 91 is turned off by a switch operating member 9*c*. At the time point where the second switch 91 is turned off, the pickup 56 is positioned below TOC (Table of Content) of the disk 12.

FIGS. 20 and 21 are longitudinal sectional views of the chuck rotating mechanism 55, where FIG. 20 illustrates an unclamped state, and FIG. 21 illustrates a clamped state. A disk table 552 in the chuck rotating mechanism 55 is fixed in a rotating shaft 556*a* of a rotary motor 556, and is rotated by the rotation of the rotating shaft 556*a*. A chuck movable portion 551 is provided slidably upward and downward upon being fitted on a cylindrical portion of the disk table 552.

A spring 554 is so provided as to urge the chuck movable portion 551 upward between the chuck movable portion 551 and the main body of the rotary motor 556. The chuck movable portion 551 and the spring 554, together with the disk table 552, are rotated. A tapered-shaped rim whose upper surface is inclined downward is formed in the outer periphery of the chuck movable portion 551. By leftward movement in FIGS. 20 and 21 (movement corresponding to the direction A in FIG. 18) of the operating member 9*c* in the chuck control mechanism 9, the chuck movable portion 551 is moved downward against the urging of the spring 554.

The chuck rotating mechanism 55 has chuck claws 553 in an approximately L-shape (a total of three chuck claws are provided; see FIGS. 18 and 19). The chuck claw 553 is provided at its base end with a rotating shaft 553*a* whose axis is in a horizontal direction. The rotating shaft 553*a* is supported by the disk table 552 so that the chuck claw 553 is vertically rotated. A bent rear surface portion of the chuck claw 553 is abutted against the chuck movable portion 551.

When the chuck movable portion 551 is moved downward upon being pressed by the operating member 9c (that is, pressed by a moving force of the pickup moving mechanism 58), the chuck claw 553 is rotated in a direction D with the rotating shaft 553a used as a fulcrum by its own weight. The chuck claw 553 retracts.

On the other hand, when the chuck movable portion 551 is moved upward by the spring 554 upon being released from the pressing by the operating member 9c, the chuck claw 553 is pressed by the chuck movable portion 551, and is rotated in a direction C with the rotating shaft 553a used as a fulcrum. An end of the chuck claw 553 protrudes from the disk table 552.

The rotation in the direction C of the cluck claw 553 is restricted by the abutment of a stopper 553b formed in the cluck claw 553 against a predetermined portion of the disk table 552.

The chuck claw 553 thus protrudes and retracts from the disk table 552, to clamp/unclamp the disk 12, eliminating the necessity of the rotatable driven portion for pressing the disk 12 from above. Consequently, the disk chucking mechanism can be made thin. A force for unclamping by the chuck claw 553 is applied by a moving force of the existing pickup moving mechanism 58, whereby the structure can be simplified, as compared with a structure in which a mechanism for applying a driving force for unclamping and clamping is provided apart from the pickup moving mechanism.

Figure 22B:
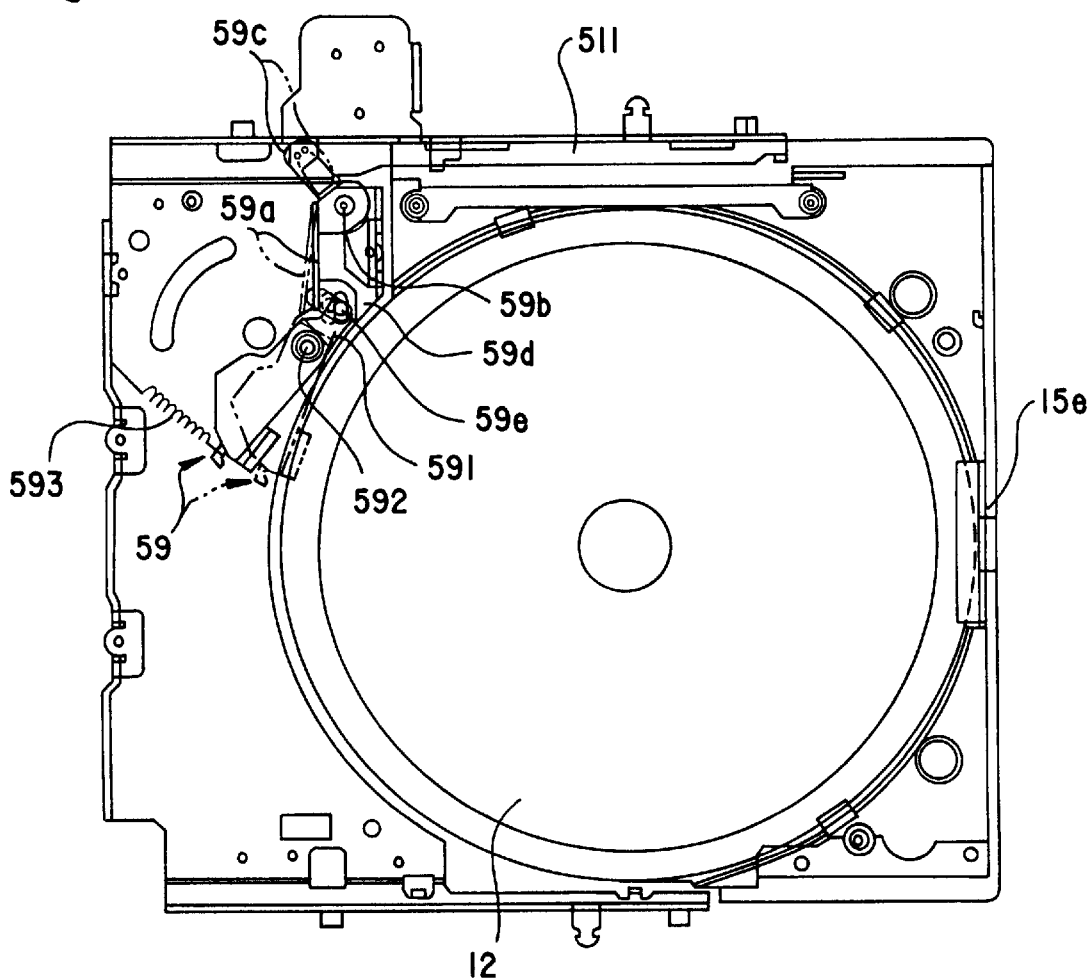
FIG. 22B is a diagram showing in perspective from the upper surface the reverse surface of a case containing the pickup arm in the present invention.

FIG. 22B is a diagram showing the reverse surface of the case containing the pickup arm 500. There is provided on the reverse surface of the case a vibration restraining member 59 mounted on a position corresponding to the disk 12 in the step below the disk 12 selected by the slidable plates for plate separation 51 and rotatable by a pin 592 in such a manner that it can protrude toward the magazine 1 and retract toward the player main body portion 5 by a rotating operation. A protrusion and retraction control mechanism 59a connecting with the vibration restraining member 59 is provided on the lower surface of the slidable plate for plate separation 511. The protrusion and retraction control mechanism 59a causes the vibration restraining member 59 to protrude toward the magazine 1 when the slidable plate for plate separation 511 is changed from the first state (see FIG. 12) to the second state (see FIG. 13), while causing the vibration restraining member 59 to retract toward the case when it is changed from the second state to the first state.

Specifically, the protrusion and retraction control mechanism 59a is provided rotatably by means of a shaft 59b, its one end 59c being engaged with an L-shaped groove 511a (see FIG. 22A) formed in the slidable plate for plate separation 511, while the other end 59d being connected to one end 591 of the vibration restraining member 59 by a pin 59e. When the slidable plate for plate separation 511 is moved in a direction X in FIG. 22A (the direction in which a plate separating operation will be performed), therefore, the protrusion and retraction control mechanism 59a is rotated in a clockwise direction in FIG. 22B. Correspondingly, the vibration restraining member 59 is rotated in a counterclockwise direction, to protrude toward the magazine 1. The one end 59c gets onto a long groove portion of the L-shaped groove 511a by the rotation in a clockwise direction of the protrusion and retraction control mechanism 59a, whereby the projecting state of the vibration restraining member 59 is maintained.

Figure 22C:
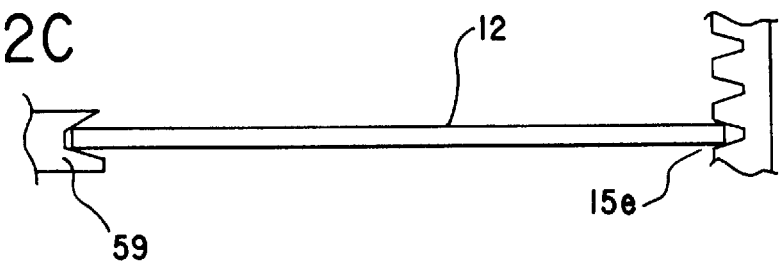
FIG. 22C is a cross-sectional view of the principal part.
Figure 24:
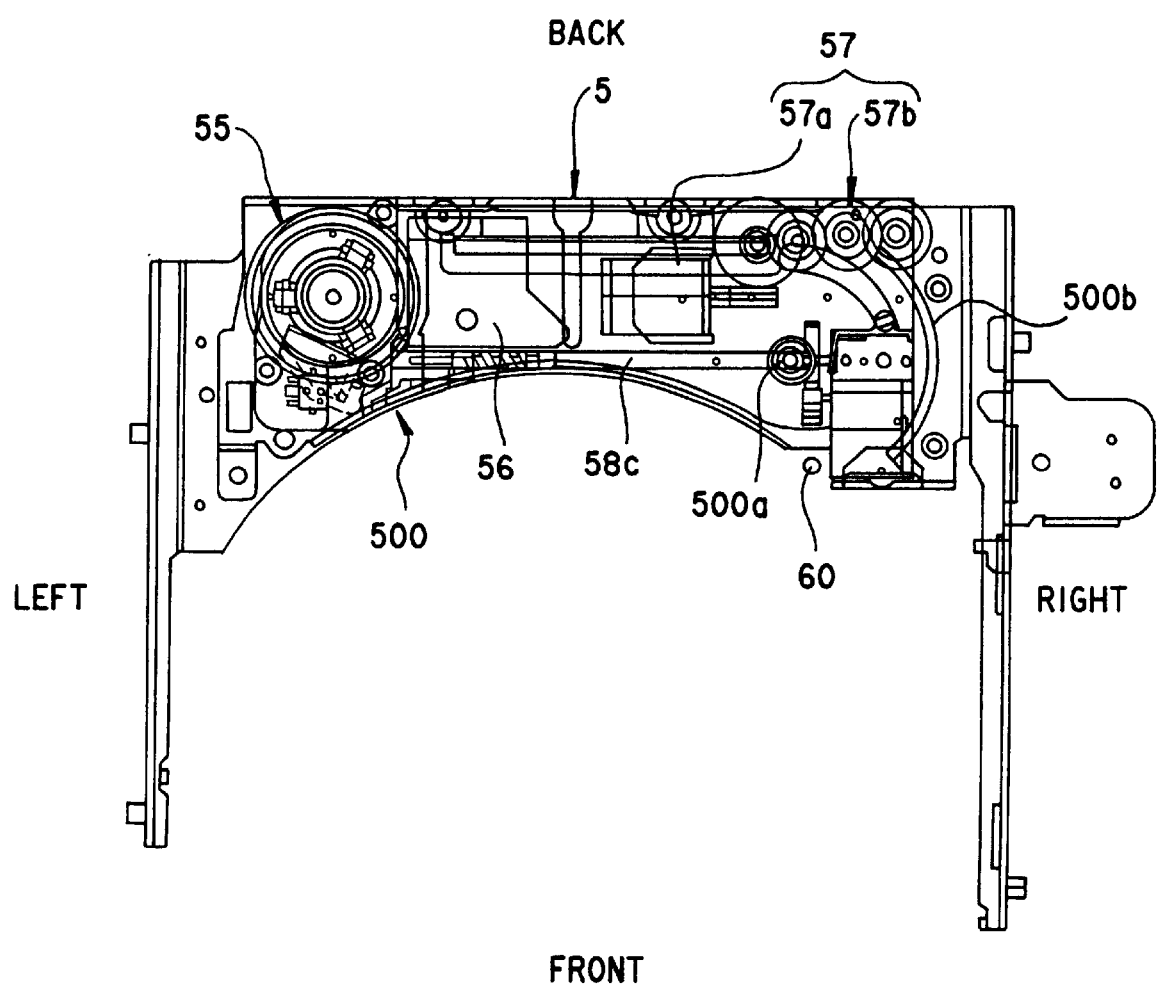
FIG. 24 is a plan view showing in perspective the pickup arm shown in FIG. 23.
Figure 25:
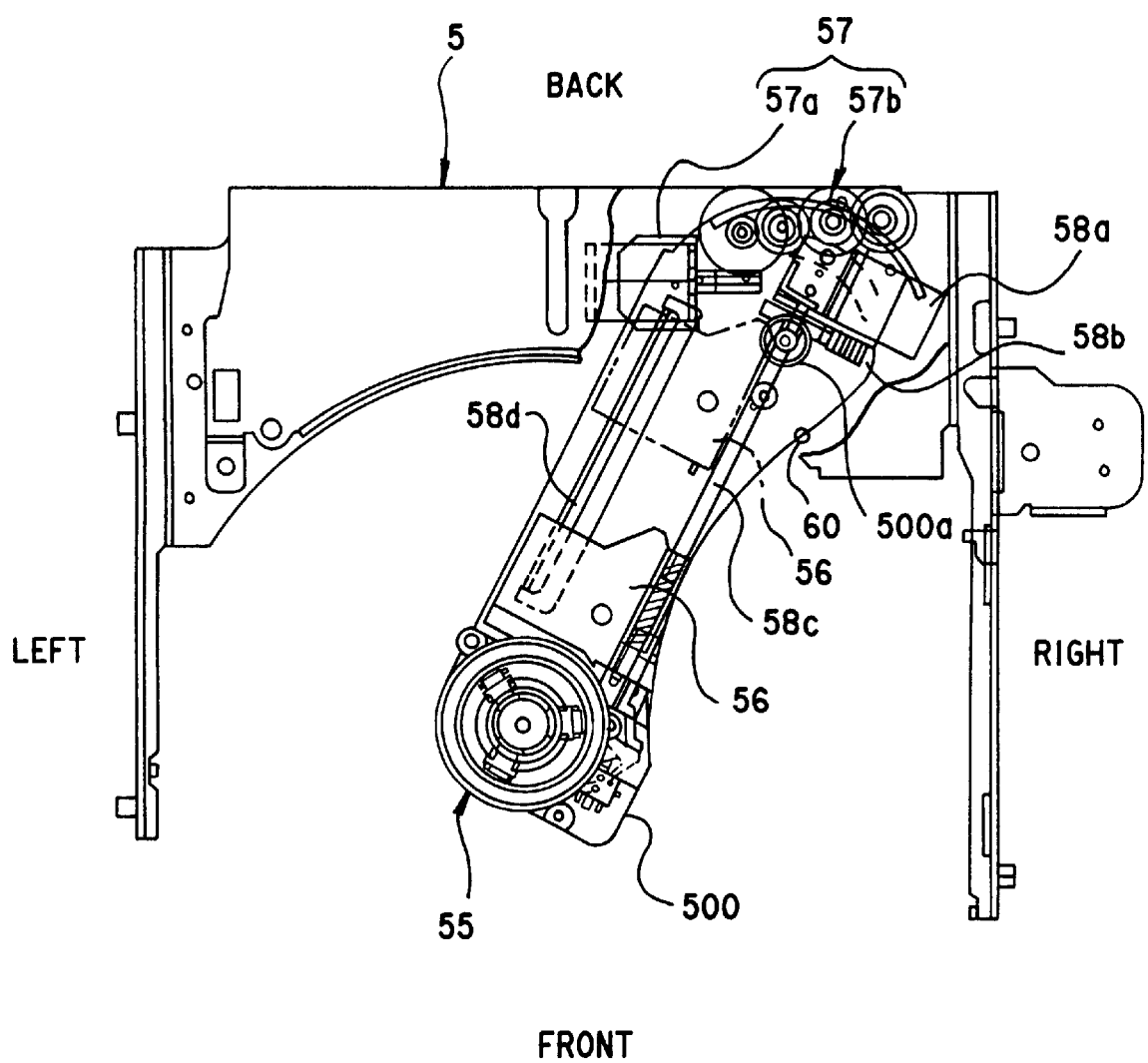
FIG. 25 is a plan view showing a state where the pickup arm is rotated toward the magazine in FIG. 24.
Figure 26:
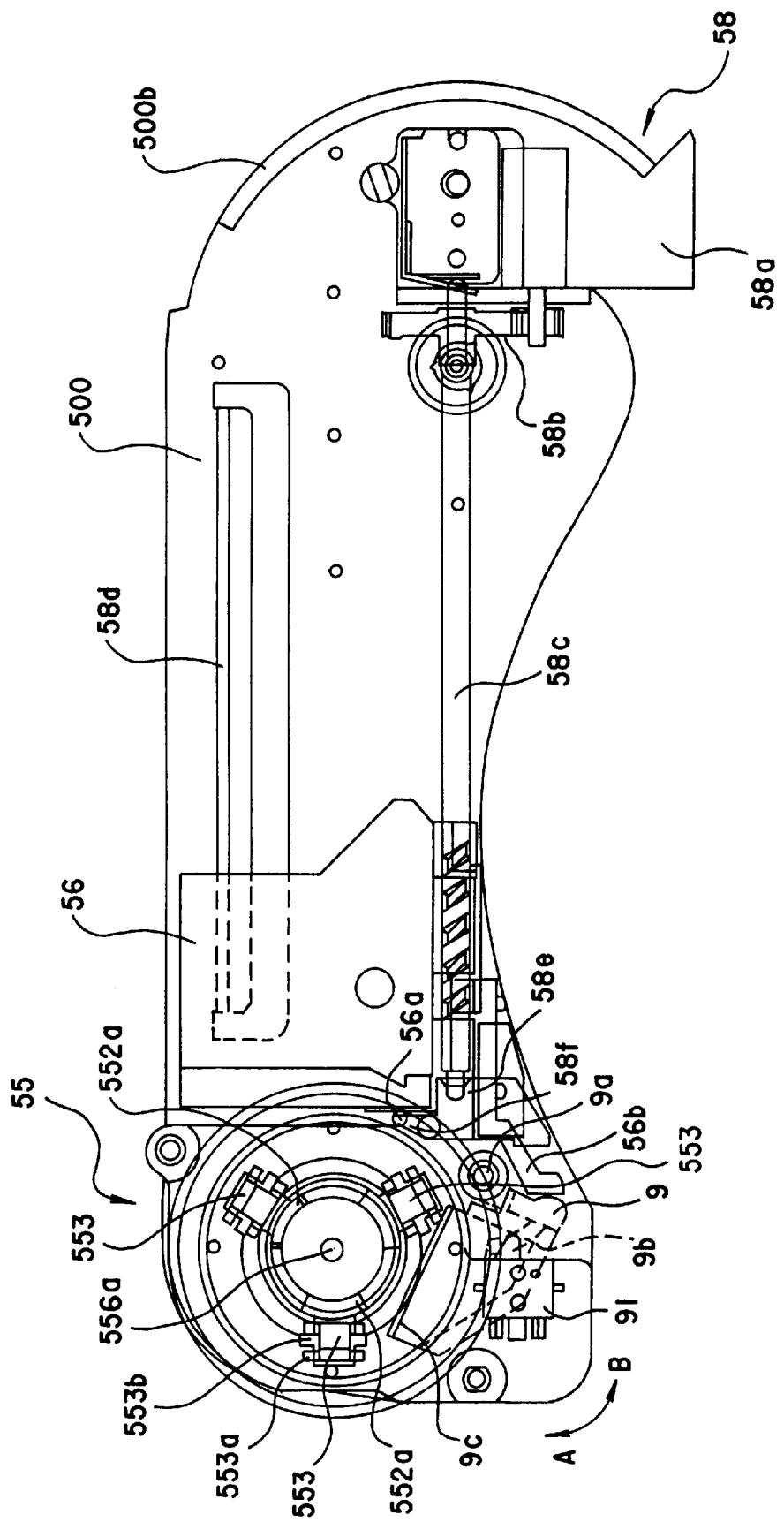
FIG. 26 is a enlarged plan view of the pickup arm shown in FIG. 23 (a disk unclamped state)
Figure 27:
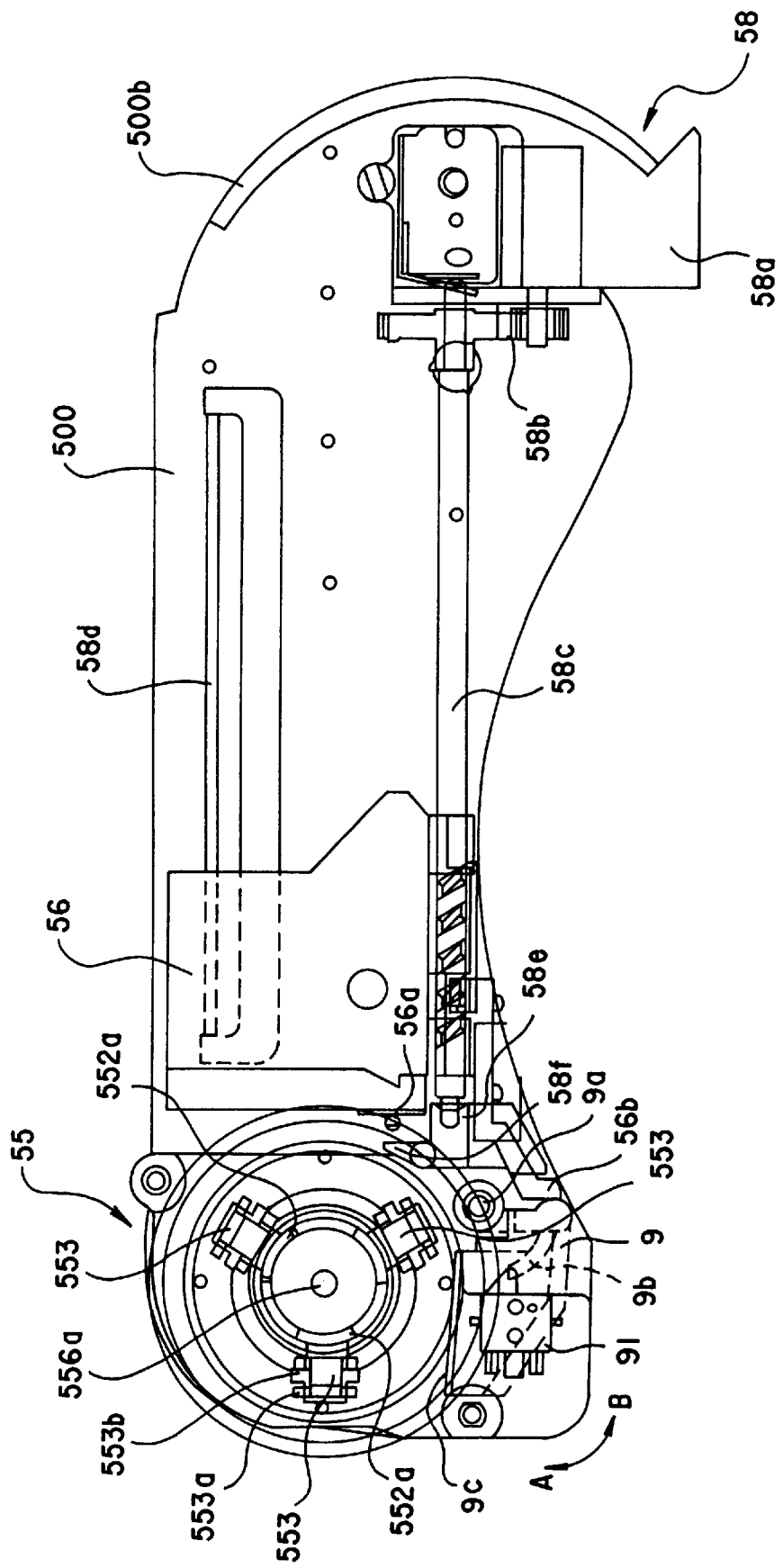
FIG. 27 is an enlarged plan view of the pickup arm shown in FIG. 23 (a disk clamped state)
Figure 28:
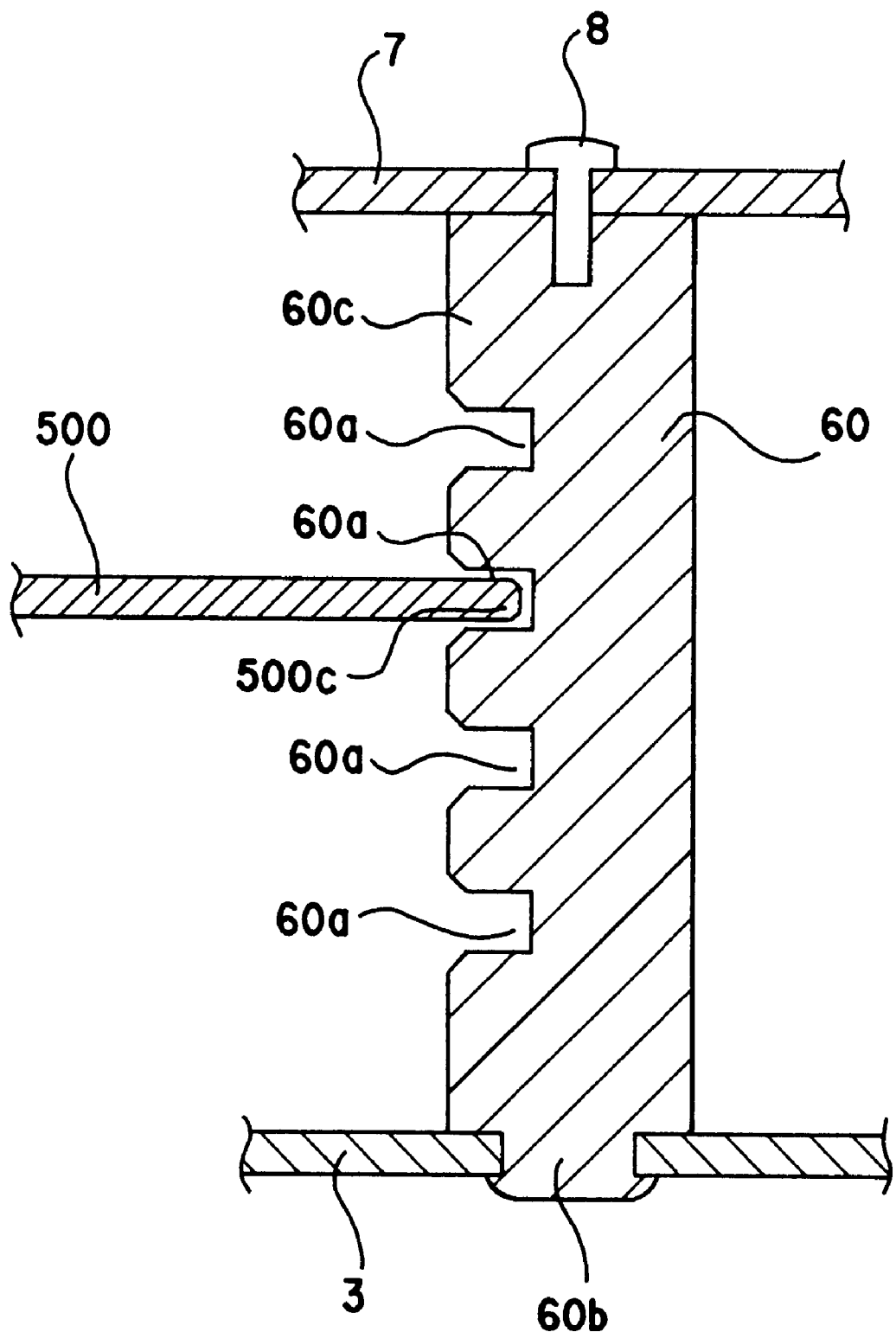
FIG. 28 is a cross-sectional view showing a mechanism in the present invention for preventing the pickup arm from vibrating.

A circular arc recess corresponding to the circular arc shape and the thickness of a peripheral edge of the disk 12 is formed in the vibration restraining member 59. When the vibration restraining member 59 protrudes toward the magazine 1, the above-mentioned circular arc recess is fitted in a peripheral edge of the disk 12 in the step below the selected disk 12, to restrain the vibration of the disk 12, combined with the holding of the disk 12 by the steps of the vertical portion 15e in the bottom plate 15, as shown in FIG. 22C.

On the other hand, when the slidable plate for plate separation 511 is moved in a direction Y, and the one end 59c leads to a recess portion of the L-shaped groove 611a, the vibration restraining member 59 is contained in the case by a spring 593. The L-shaped groove 611a is formed as indicated by a dotted line in FIG. 22A, making it possible to also eliminate the necessity of the spring 593.

When a plate separating operation for clamping the selected disk 12 is performed, the slidable plate for plate separation 511 assumes the states shown in FIGS. 13 to 15. In such states, there exists no restriction of the disk 12 positioned in the step below the selected disk 12 against its upward movement. When the disk player is used as an on-vehicle equipment, the disk 12 in the step below the selected disk 12 may emit an abnormal sound, that is, clatter upon vibrating upward and downward by the vibration of a vehicle. Further, when the pickup arm 500 enters the magazine 1 in a state where the disk 12 in the step below the selected disk 12 jumps, the pickup arm 500 may touch the disk 12 to damage the disk 12.

In the present embodiment, the vibration restraining member 59 is provided. The vibration restraining member 59 protrudes toward the magazine 1 when it is changed from the first state (see FIG. 12) to the second state (see FIG. 13) as described above. Vibration and flaws in the disk 12 in the step below the selected disk 12 can be prevented by fitting the circular arc recess in the peripheral edge of the disk 12 in the step below the selected disk 12.

FIGS. 23 to 28 illustrate a disk player comprising a vibration restraining mechanism of the pickup arm 500.

As shown in FIG. 23, the pickup arm 500 exits from its containing portion, to position the disk chucking mechanism in the center hole of the disk at the time of reproducing the disk. A stopper 60 is provided in a position corresponding to an edge 500c of the pickup arm 500 in this position. The stopper 60 has its one end 60b fixed to the player chassis 3 by caulking and has the other end 60c fixed to an upper cover 7 of the player by a screw 8. Further, the pickup arm 500 assumes positions in four steps by the elevation of the player main body portion 5 by the elevator mechanism 4. Four recesses 60a corresponding to the positions in the four steps are formed in the stopper 60.

The edge 500c of the pickup arm 500 is so formed in a thin plate shape as to be fitted in the recess 60a. In a state where the edge 500c is fitted in the recess 60a, a clearance is formed therebetween (above and below the edge 500c and on the side of an end surface of the edge 500c). The width of the clearance corresponds to the allowable amount of the shift in position of the pickup arm 500 at the time of reproduction.

Consequently, in the pickup arm 500 at the time of reproduction, the inclination thereof is prevented, and the movement thereof in the up-and-down direction and in the horizontal direction (toward the center of the disk) is restricted in a predetermined range by the stopper 60.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk chucking mechanism comprising:

a disk table, on which a disk provided with a center hole is put, rotated by rotary driving means;

a claw member so provided as to protrude and retract from an upper surface of said disk table, said claw member for clamping the disk through the center hole at a time that the claw member protrudes, while unclamping the disk at a time that the claw member retracts;

a chuck movable portion slidably provided along an axis of rotation of said disk table for causing said claw member to protrude and retract by the sliding;

urging means for urging said chuck movable portion in a direction in which said claw member protrudes;

pickup moving means for moving a pickup; and a chuck control mechanism moved upon being pressed by a pressing member provided in the pickup in a position where the pickup is in proximity to said disk table for sliding said chuck movable portion in a direction in which said claw member retracts.

2. The disk chucking mechanism according to claim 1, further comprising a switch moved with said pickup, to judge said unclamped state depending on whether or not said switch is pressed by a switch pressing member provided in the vicinity of said disk table, and to stop the movement of the pickup by the pickup moving means when the switch is operated.

3. The disk chucking mechanism according to claim 1, further comprising a switch operated by said chuck control mechanism when said pickup is moved in the direction away from said disk table, and a lens portion of the pickup is in a position corresponding to TOC (Table of Contents) of the disk.

* * * * *